US009088939B2

(12) United States Patent
Ulupinar et al.

(10) Patent No.: US 9,088,939 B2
(45) Date of Patent: Jul. 21, 2015

(54) BEARER QOS MAPPING FOR CELL RELAYS

(75) Inventors: Fatih Ulupinar, San Diego, CA (US);
Gavin B. Horn, La Jolla, CA (US);
Parag A. Agashe, San Diego, CA (US);
Nathan E. Tenny, Poway, CA (US);
Yongsheng Shi, Falls Church, VA (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 12/604,205

(22) Filed: Oct. 22, 2009

(65) Prior Publication Data

US 2010/0103863 A1 Apr. 29, 2010

Related U.S. Application Data

(60) Provisional application No. 61/108,287, filed on Oct. 24, 2008.

(51) Int. Cl.
| | |
|---|---|
| *H04B 1/66* | (2006.01) |
| *H04W 40/22* | (2009.01) |
| *H04L 29/12* | (2006.01) |
| *H04W 36/00* | (2009.01) |
| *H04L 29/06* | (2006.01) |

(Continued)

(52) U.S. Cl.
CPC ......... *H04W 40/22* (2013.01); *H04L 29/12207* (2013.01); *H04L 61/20* (2013.01); *H04L 69/04* (2013.01); *H04L 69/22* (2013.01); *H04W 36/0072* (2013.01); *H04B 7/155* (2013.01); *H04L 2212/0025* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 5,999,980 | A | 12/1999 | Tanaka et al. |
| 6,839,339 | B1 | 1/2005 | Chuah |

(Continued)

FOREIGN PATENT DOCUMENTS

| | | |
|---|---|---|
| CN | 1470120 A | 1/2004 |
| CN | 201004703 Y | 1/2008 |

(Continued)

OTHER PUBLICATIONS

3GPP TS 36.331 (Sep. 2008) Technical Specification; 3rd Generation Partnership Project; Technical Specification Group Radio Access Network; Evolved Universal Terrestrial Radio Access (E-UTRA) Radio Resource Control (RRC); Protocol specification (Release 8), Sep. 1, 2008, pp. 33-34, XP002572886, paragraph 5.3.5, p. 34, lines 1-3, figure 5.3.5.1-1.

(Continued)

*Primary Examiner* — Fan Ng
(74) *Attorney, Agent, or Firm* — Michael J. DeHaemer, Jr.

(57) ABSTRACT

Systems and methodologies are described that facilitate mapping multiple evolved packet system (EPS) bearers to a single relay eNB radio bearer. In particular, an upstream eNB can select a radio bearer of a downstream eNB for association to an EPS bearer; the selection can be based on a best effort match or substantially any logic. The upstream eNB can store an association between the radio bearer and EPS bearer for subsequent downstream packet routing. The upstream eNB can also provide an indication of the selected radio bearer to the downstream relay eNB to facilitate upstream packet routing therefrom. The upstream eNB can alternatively select the radio bearer of the downstream eNB for association to the EPS bearer based on a quality of service (QoS) class identifier (QCI) of the EPS bearer.

29 Claims, 12 Drawing Sheets

(51) Int. Cl.
*H04B 7/155* (2006.01)
*H04W 84/04* (2009.01)

(56) References Cited

U.S. PATENT DOCUMENTS

| | | | |
|---|---|---|---|
| 7,301,947 B2 | 11/2007 | Tourunen et al. | |
| 7,616,601 B2 | 11/2009 | Norrgard et al. | |
| 7,876,808 B2* | 1/2011 | Catreux-Erceg et al. | 375/140 |
| 7,881,247 B2* | 2/2011 | Pan et al. | 370/319 |
| 7,986,915 B1* | 7/2011 | Wang et al. | 455/7 |
| 8,054,806 B2 | 11/2011 | Aydin et al. | |
| 8,055,263 B2 | 11/2011 | Kwak et al. | |
| 8,064,909 B2 | 11/2011 | Spinelli et al. | |
| 2003/0223381 A1 | 12/2003 | Schroderus | |
| 2004/0001508 A1 | 1/2004 | Zheng et al. | |
| 2005/0265363 A1 | 12/2005 | Chen | |
| 2006/0139869 A1 | 6/2006 | Matusz | |
| 2006/0262732 A1 | 11/2006 | Joutsenvirta et al. | |
| 2007/0041346 A1 | 2/2007 | Bae et al. | |
| 2007/0072604 A1 | 3/2007 | Wang | |
| 2007/0171871 A1 | 7/2007 | Forsberg | |
| 2007/0213060 A1 | 9/2007 | Shaheen | |
| 2007/0230352 A1 | 10/2007 | Kokku et al. | |
| 2008/0062904 A1 | 3/2008 | Tzu-Ming | |
| 2008/0064390 A1 | 3/2008 | Kim | |
| 2008/0070562 A1 | 3/2008 | Cho et al. | |
| 2008/0080399 A1 | 4/2008 | Wang et al. | |
| 2008/0123660 A1 | 5/2008 | Sammour et al. | |
| 2008/0144555 A1 | 6/2008 | Hong et al. | |
| 2008/0165719 A1 | 7/2008 | Visotsky | |
| 2008/0165776 A1 | 7/2008 | Tao et al. | |
| 2008/0181176 A1 | 7/2008 | Lee et al. | |
| 2008/0219203 A1* | 9/2008 | Chou et al. | 370/315 |
| 2008/0240439 A1 | 10/2008 | Mukherjee et al. | |
| 2008/0268846 A1* | 10/2008 | Shaheen | 455/436 |
| 2008/0268852 A1 | 10/2008 | Petrovic et al. | |
| 2009/0016282 A1* | 1/2009 | Gasparroni et al. | 370/329 |
| 2009/0042576 A1 | 2/2009 | Mukherjee et al. | |
| 2009/0043902 A1* | 2/2009 | Faccin | 709/229 |
| 2009/0052409 A1* | 2/2009 | Chen et al. | 370/338 |
| 2009/0080422 A1 | 3/2009 | Lee et al. | |
| 2009/0109924 A1 | 4/2009 | Sato | |
| 2009/0111423 A1 | 4/2009 | Somasundaram et al. | |
| 2009/0111476 A1* | 4/2009 | Hamalainen et al. | 455/450 |
| 2009/0196177 A1* | 8/2009 | Teyeb et al. | 370/231 |
| 2009/0201878 A1 | 8/2009 | Kotecha et al. | |
| 2009/0215459 A1* | 8/2009 | Kuo | 455/436 |
| 2009/0238207 A1* | 9/2009 | Zhao et al. | 370/468 |
| 2009/0257432 A1 | 10/2009 | Yamaguchi et al. | |
| 2009/0296626 A1 | 12/2009 | Hottinen et al. | |
| 2010/0091823 A1 | 4/2010 | Retana et al. | |
| 2010/0097976 A1* | 4/2010 | Agrawal et al. | 370/315 |
| 2010/0103845 A1 | 4/2010 | Ulupinar et al. | |
| 2010/0103857 A1 | 4/2010 | Ulupinar et al. | |
| 2010/0103861 A1 | 4/2010 | Ulupinar et al. | |
| 2010/0103862 A1 | 4/2010 | Ulupinar et al. | |
| 2010/0103864 A1 | 4/2010 | Ulupinar et al. | |
| 2010/0103865 A1 | 4/2010 | Ulupinar et al. | |
| 2010/0208645 A1 | 8/2010 | H m l inen et al. | |
| 2010/0226314 A1* | 9/2010 | Xu | 370/328 |
| 2010/0238805 A1 | 9/2010 | Ludwig et al. | |
| 2010/0246533 A1* | 9/2010 | Lundin et al. | 370/332 |
| 2010/0260098 A1 | 10/2010 | Ulupinar et al. | |
| 2010/0260126 A1 | 10/2010 | Ulupinar et al. | |
| 2010/0309881 A1* | 12/2010 | Kim et al. | 370/331 |
| 2011/0044279 A1 | 2/2011 | Johansson et al. | |
| 2011/0222428 A1 | 9/2011 | Charbit et al. | |
| 2011/0235514 A1 | 9/2011 | Huang et al. | |
| 2012/0120831 A1 | 5/2012 | Gonsa et al. | |
| 2012/0140666 A1 | 6/2012 | Takahashi et al. | |
| 2012/0155375 A1 | 6/2012 | Zhu | |

FOREIGN PATENT DOCUMENTS

| | | |
|---|---|---|
| CN | 101138190 A | 3/2008 |
| CN | 101227714 A | 7/2008 |
| CN | 201134894 Y | 10/2008 |
| DE | 202007009672 | 11/2007 |
| EP | 0961516 A2 | 12/1999 |
| EP | 1122925 | 8/2001 |
| EP | 1362453 B1 | 11/2003 |
| EP | 1912390 A1 | 4/2008 |
| EP | 1921807 A1 | 5/2008 |
| EP | 2081332 A1 | 7/2009 |
| JP | 2001244993 | 9/2001 |
| JP | 2001292093 A | 10/2001 |
| JP | 2003519965 A | 6/2003 |
| JP | 2004509566 A | 3/2004 |
| JP | 2004511178 A | 4/2004 |
| JP | 2007506378 A | 3/2007 |
| JP | 2007143138 A | 6/2007 |
| JP | 2007531430 A | 11/2007 |
| JP | 2007318719 A | 12/2007 |
| JP | 2008104159 A | 5/2008 |
| JP | 2008172759 A | 7/2008 |
| JP | 2009535980 A | 10/2009 |
| JP | 2010518739 A | 5/2010 |
| KR | 20060009433 A | 2/2006 |
| KR | 20080048588 A | 6/2008 |
| TW | 419922 B | 1/2001 |
| TW | 490950 | 6/2002 |
| TW | 1273853 B | 2/2007 |
| TW | 200746863 | 12/2007 |
| TW | M329296 U | 3/2008 |
| TW | 200838192 | 9/2008 |
| WO | WO0225895 A1 | 3/2002 |
| WO | 0230043 A2 | 4/2002 |
| WO | WO2007019672 | 2/2007 |
| WO | 2007130281 A2 | 11/2007 |
| WO | 2008008145 A2 | 1/2008 |
| WO | WO2008072687 | 6/2008 |
| WO | 2008093472 A1 | 8/2008 |
| WO | WO-2008097147 A1 | 8/2008 |
| WO | WO2008125729 | 10/2008 |
| WO | WO2009080601 | 7/2009 |
| WO | WO2009134178 | 11/2009 |

OTHER PUBLICATIONS

3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Draft; R2-095391 TR 36.806 V0.1.0 on Relay Architectures for E-UTRA, 3rd Generation Partnership Project (3GPP); France, no. Miyazki; Sep. 1, 2009, XP050389991, paragraph 4, subparagraphs 4.2.1, 4.2.2, 4.2.3, subparagraphs 54.2.3.1, 4.2.3.2, figures 4.2.3.1-1 and 4.2.3.1-s, figures 4.2.3.2-1 and 4.2.3.2-2.

"A discussion on some technology components for LTE-Advanced" 3GPP Draft; R1-082024 (LTE-Advanced Technology Components), 3rd Generation Partnership Project (3GPP), Mobile Competence Centre; 650, Route Des Lucioles; F-06921 Sophia-Antipolis Cedex; France, vol. RAN WGI, no. Kansas City, USA; May 14, 2008, XP050110365, the whole document.

Alcatel-Lucent Shanghai Bell et al: "Considerations on Type II Relay Related Issues," 3GPP Draft, R2-095853 Considerations on Type II Relay Related Issues, 3rd Generation Partnership Project, Mobile Competence Centre, Oct. 16, 2009.

International Search Report—PCT/US2009/061943—International Search Authority—European Patent Office, May 5, 2010.

"LTE-A RAN3 Baseline Document" 3GPP Draft; R3-091447, SRD Generation Partnership Project (3GPP), Mobile Competence Centre ; 650, Route Des Lucioles ; F-06921 Sophia-Antipolis Cedex ; France, no. San Francisco, USA; May 9, 2009, XP050341769 [retrieved on May 9, 2009] the whole document.

Mapping_between_EPS_bearer_and_radio_bearer_3GPP_Draft_R2081902_XP050139586.

(56) References Cited

OTHER PUBLICATIONS

Panasonic: "Discussion on the Various Types of Relays," 3GPP Draft, R1-082397, 3rd Generation Partnership Project, Mobile Competence Centre, Jun. 24, 2008.
Partial International Search Report & Written Opinion—PCT/US09/061933, International Search Authority—European Patent Office—Feb. 4, 2010.
Partial International Search Report & Written Opinion—PCT/US09/061934, International Search Authority—European Patent Office—Feb. 4, 2010.
Partial International Search Report & Written Opinion—PCT/US09/061937, International Search Authority—European Patent Office—Feb. 4, 2010.
Partial International Search Report & Written Opinion—PCT/US09/061939, International Search Authority—European Patent Office—Feb. 4, 2010.
RAN3 LTE—A Rapporteur: "LTE-A RAN3 Baseline Document" 3GPP Draft; R3-091447, 3rd Generation Partnership Project (3GPP), France, San Francisco, USA; May 9, 2009, XP050341769.
Rapporteur (Ericsson): "Updated TP to TR 36.806" 3GPP Draft; R3-092628, 3rd Generation Partnership Project (3GPP), France, no. Miyazaki; Oct. 12, 2009, XP050392105, paragraph 4, subparagraphs 4.2.2, 4.2.3, 4.2.4 and 4.2.4.2, figures 4.2.4.2-1 and 4.2.4.2-2.
"Universal Mobile Telecommunciations System (UMTS) Evolved Universal Terrestrial Radio Access (E-UTRA) and Evolved Universal Terrestrial Radio Access Network (E-UTRAN; Overall description; Stage 2 (3GPP TS 36.300 version 8.6.0 Release 8); ETSI TS 136 300" ETSI Standard, European Telecommunications Standards Institute (ETSI), Sophia Antipolis Cedex, France, vol. 3-R2, No. V8.6.0, Oct. 1, 2008, XP014042629, Paragraph 10.5.
"Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.2.0 Release 8); ETSI TS 136 300" ETSI Standards, LIS, Sophia Antipolis Cedex, France, vol. 3-R2, No. V8.2.0, Oct. 1, 2007, XP014040285 ISSN: 0000-0001 the whole document.
Vodafone: "Transmission efficiencies and Security for the SI" 3GPP Draft; R3-071610, 3rd Generation Partnership Project (3GPP), Mobile Competence Centre ; 650, Route Des Lucioles ; F-06921 Sophia-Antipolis Cedex ; France, vol. RAN WG3, no. Athens, Greece;.
International Search Report—PCT/US2009/061947—International Search Authority, European Patent Office, Sep. 4, 2010.
Written Opinion—PCT/US2009/061947—ISA/EPO—Apr. 9, 2010.
"3rd Generation Partnership Project; Technical Specification Group Core Network and Terminals; Gprs Tunnelling Protocol User Plane (GTPv1-U) (Release 8)", 3GPP Ts 29.281 V1.1.0, 3GPP, Oct. 17, 2008, pp. 1-19.
Qualcomm Europe: "Drb establishment indication to Nas", 3GPP Tsg-Ran WG2 meeting #63, R2-084066, 3GPP, Aug. 22, 2008.
Taiwan Search Report - TW098135982 - Tipo - 2013-04-08 (090167U4TW).

\* cited by examiner

BEARER QOS MAPPING FOR CELL RELAYS

CLAIM OF PRIORITY UNDER 35 U.S.C. §119

The present application for patent claims priority to Provisional Application No. 61/108,287 entitled "CELL RELAY BASE STATION FOR LTE" filed Oct. 24, 2008, and assigned to the assignee hereof and hereby expressly incorporated by reference herein.

BACKGROUND

1. Field

The following description relates generally to wireless communications, and more particularly to mapping evolved packet system (EPS) bearers to radio bearers.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

Cell relays can be provided to expand network capacity and coverage area by facilitating communication between mobile devices and access points. For example, a cell relay can establish a backhaul link with a donor access point, which can provide access to a number of cell relays, and the cell relay can establish an access link with one or more mobile devices or additional cell relays. To mitigate modification to backend core network components, communication interfaces, such as S1-U, can terminate at the donor access point. Thus, the donor access point appears as a normal access point to backend network components. To this end, the donor access point can route packets from the backend network components to the cell relays for communicating to the mobile devices. A cell relay, however, can be limited in the number of radio bearers it can establish with an upstream cell relay or donor access point while supporting a number of evolved packet system (EPS) bearers.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating mapping multiple evolved packet system (EPS) bearers to a single cell relay radio bearer of one or more cell relays. In particular, an upstream cell relay or donor access point can specify a radio bearer of a downstream cell relay for a given EPS bearer (e.g., in conjunction with requesting bearer setup) and store a bearer mapping table to route subsequent downstream packets to the appropriate bearer. The mapping can be performed, for example, according to a best effort match. In another example, radio bearers of a cell relay can be mapped to EPS bearers based on a quality of service (QoS) class identifier (QCI) for the EPS bearer. In either case, multiple EPS bearers are mapped to single radio bearers to allow a cell relay or donor access point to communicate with multiple cell relays.

According to related aspects, a method is provided that includes receiving a bearer setup request comprising parameters regarding an EPS bearer initialized in a wireless network. The method also includes selecting a radio bearer of a downstream relay eNB to facilitate communicating data to and from the EPS bearer and transmitting data received over the EPS bearer to the downstream relay eNB using the radio bearer.

Another aspect relates to a wireless communications apparatus. The wireless communications apparatus can include at least one processor configured to obtain a bearer setup request including parameters related to an EPS bearer. The at least one processor is further configured to select a radio bearer of a downstream eNB for association with the EPS bearer and transmit data received over the EPS bearer to the downstream eNB over the radio bearer. The wireless communications apparatus also comprises a memory coupled to the at least one processor.

Yet another aspect relates to an apparatus. The apparatus includes means for receiving a bearer setup request comprising parameters regarding an EPS bearer initialized in a wireless network and means for selecting a radio bearer of a downstream relay eNB to facilitate communicating data to and from the EPS bearer. The apparatus also includes means for transmitting data received over the EPS bearer to the downstream relay eNB using the radio bearer.

Still another aspect relates to a computer program product, which can have a computer-readable medium including code for causing at least one computer to receive a bearer setup request comprising parameters regarding an EPS bearer initialized in a wireless network and code for causing the at least one computer to select a radio bearer of a downstream relay eNB to facilitate communicating data to and from the EPS bearer. The computer-readable medium can also comprise code for causing the at least one computer to transmit data received over the EPS bearer to the downstream relay eNB using the radio bearer.

Moreover, an additional aspect relates to an apparatus including a backhaul link component that receives a bearer setup request comprising parameters regarding an EPS bearer initialized in a wireless network and a relay bearer selecting component that chooses a radio bearer of a downstream relay eNB to facilitate communicating data to and from the EPS bearer. The apparatus can further include a bearer communicating component that transmits data received over the EPS bearer to the downstream relay eNB using the radio bearer.

According to another aspect, a method is provided that includes receiving an association of an EPS bearer to a local radio bearer and storing the association in a routing table. The method also includes receiving data related to the EPS bearer from an upstream eNB over the local radio bearer Another aspect relates to a wireless communications apparatus. The wireless communications apparatus can include at least one processor configured to obtain an association of an EPS bearer to a local radio bearer and store the association in a routing table for subsequent packet routing. The at least one processor is further configured to receive data from an upstream eNB related to the EPS bearer over the local radio bearer. The wireless communications apparatus also comprises a memory coupled to the at least one processor.

Yet another aspect relates to an apparatus. The apparatus includes means for receiving an association of an EPS bearer to a local radio bearer and means for storing the association in a routing table. The apparatus also includes means for receiving data related to the EPS bearer from an upstream eNB over the local radio bearer.

Still another aspect relates to a computer program product, which can have a computer-readable medium including code for causing at least one computer to receive an association of an EPS bearer to a local radio bearer and code for causing the at least one computer to store the association in a routing table. The computer-readable medium can also comprise code for causing the at least one computer to receive data related to the EPS bearer from an upstream eNB over the local radio bearer.

Moreover, an additional aspect relates to an apparatus including a bearer select receiving component that receives an association of an EPS bearer to a local radio bearer. The apparatus can further include an EPS bearer mapping component that stores the association in a routing table and a bearer communicating component that receives data related to the EPS bearer from an upstream eNB over the local radio bearer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
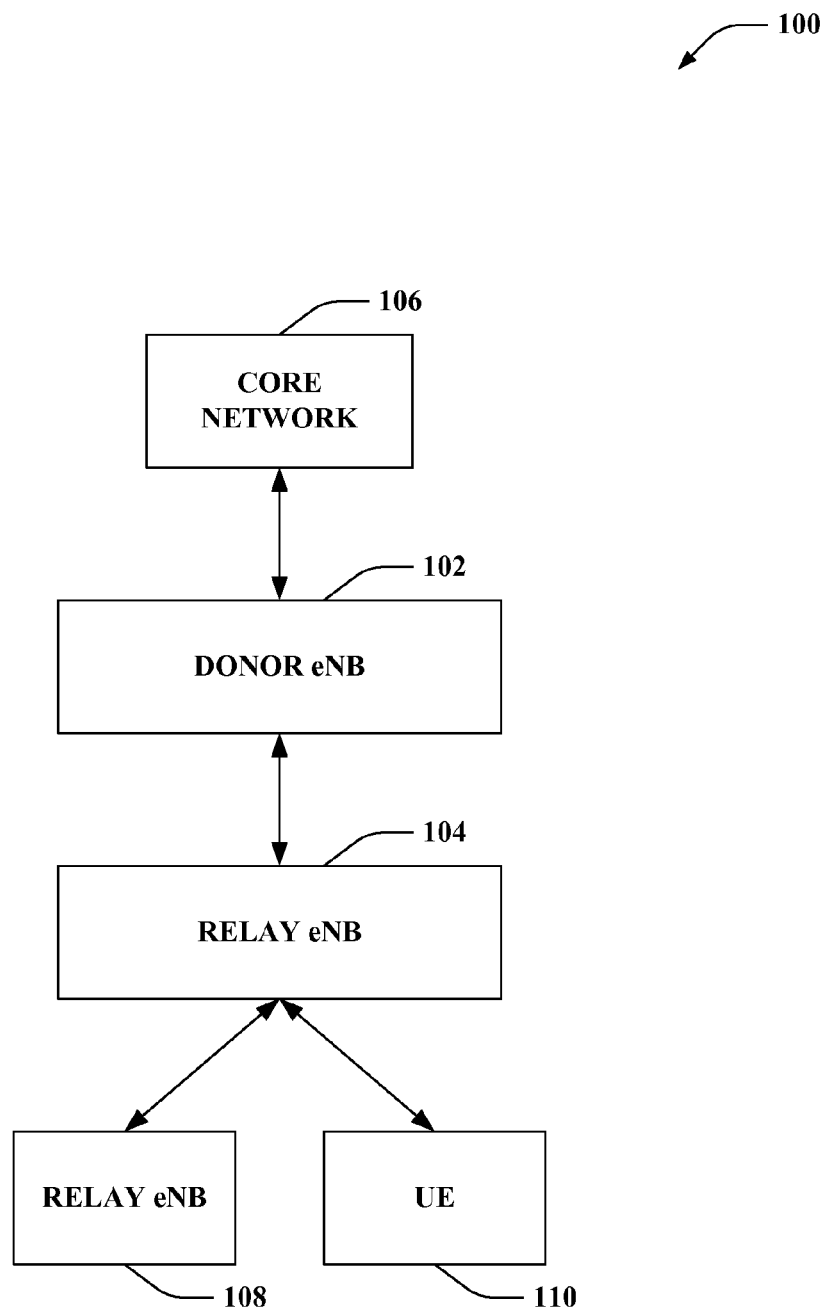
FIG. 1 is an illustration of an example wireless communications system that facilitates providing relays for wireless networks.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing relay functionality in wireless networks. System 100 includes a donor eNB 102 that provides one or more relay eNBs, such as relay eNB 104, with access to a core network 106. Similarly, relay eNB 104 can provide one or more disparate relay eNBs, such as relay eNB 108, or UEs, such as UE 110, with access to the core network 106 via donor eNB 102. Donor eNB 102, which can also be referred to as a cluster eNB, can communicate with the core network 106 over a wired or wireless backhaul link, which can be an LTE or other technology backhaul link. In one example, the core network 106 can be a 3GPP LTE or similar technology network.

Donor eNB 102 can additionally provide an access link for relay eNB 104, which can also be wired or wireless, LTE or other technologies, and the relay eNB 104 can communicate with the donor eNB 102 using a backhaul link over the access link of the donor eNB 102. Relay eNB 104 can similarly provide an access link for relay eNB 108 and/or UE 110, which can be a wired or wireless LTE or other technology link. In one example, donor eNB 102 can provide an LTE access link, to which relay eNB 104 can connect using an LTE backhaul, and relay eNB 104 can provide an LTE access link to relay eNB 108 and/or UE 110. Donor eNB 102 can connect to the core network 106 over a disparate backhaul link technology. Relay eNB 108 and/or UE 110 can connect to the relay eNB 104 using the LTE access link to receive access to core network 106, as described. A donor eNB and connected relay eNBs can be collectively referred to herein as a cluster.

According to an example, relay eNB 104 can connect to a donor eNB 102 at the link layer (e.g., media access control (MAC) layer) as would a UE in regular LTE configurations. In this regard, donor eNB 102 can be a regular LTE eNB requiring no changes at the link layer or related interface (e.g., E-UTRA-Uu) to support the relay eNB 104. In addition, relay eNB 104 can appear to UE 110 as a regular eNB at the link layer, such that no changes are required for UE 110 to connect to relay eNB 104 at the link layer, for example. In addition, relay eNB 104 can configure procedures for resource partitioning between access and backhaul link, interference management, idle mode cell selection for a cluster, and/or the like.

With respect to transport layer communications, transport protocols related to relay eNB 108 or UE 110 communications can terminate at the donor eNB 102, referred to as cell relay functionality, since the relay eNB 104 is like a cell of the donor eNB 102. For example, in a cell relay configuration, donor eNB 102 can receive communications for the relay eNB 104 from the core network 106, terminate the transport protocol, and forward the communications to the relay eNB 104 over a disparate transport layer keeping the application layer substantially intact. It is to be appreciated that the forwarding transport protocol type can be the same as the terminated transport protocol type, but is a different transport layer established with the relay eNB 104.

Relay eNB 104 can determine a relay eNB or UE related to the communications, and provide the communications to the relay eNB or UE (e.g., based on an identifier thereof within the communications). Similarly, donor eNB 102 can terminate the transport layer protocol for communications received from relay eNB 104, translate the communications to a disparate transport protocol, and transmit the communications over the disparate transport protocol to the core network 106 with the application layer intact for relay eNB 104 as a cell relay. In these examples, where relay eNB 104 is communicating with another relay eNB, the relay eNB 104 can support application protocol routing to ensure communications reach the correct relay eNB.

Moreover, application layer protocols can terminate at upstream eNBs. Thus, for example, application layer protocols for relay eNB 108 and UE 110 can terminate at relay eNB 104, and similarly for relay eNB 104 can terminate at donor eNB 102. The transport and application layer protocols, for example, can relate to S1-U, S1-MME, and/or X2 interfaces. S1-U interface can be utilized to communicate in a data plane between a node and a serving gateway (not shown) of the core network 106. S1-MME interface can be utilized for control plane communications between a node and a mobility management entity (MME) (not shown) of the core network 106. X2 interface can be utilized for communications between eNBs. In addition, for example, donor eNB 102 can communicate with other relay eNBs to allow communications therebetween over the access network (e.g., relay eNB 104 can communicate with one or more additional relay eNBs connected to donor eNB 102).

According to an example, UE 110 can generate a request to core network 106 (via donor eNB 102 and relay eNB 104) that causes the core network, or one or more components thereof, to setup a bearer for the UE 110. Core network 106 can setup an evolved packet system (EPS) bearer for the UE 110 for a certain type of communication class (e.g., conversational voice, conversational video, non-conversational video, buffered video, real time or interactive gaming, internet protocol (IP) multimedia subsystem (IMS) signaling, and/or the like) and can forward a radio bearer setup request to donor eNB 102. In one example, donor eNB 102 can select a radio bearer of relay eNB 104 to correspond to the EPS bearer; this can be based on a best effort match. In this example, donor eNB 102 can forward the bearer setup request, along with the radio bearer assignment and an identifier unique to donor eNB 102 that can correspond to the EPS bearer and/or the radio bearer that is to be setup by UE 110, to relay eNB 104. Donor eNB 102 can store an association between the selected radio bearer of relay eNB 104 and the EPS bearer for subsequent packet routing. In one example, this can be an association between the selected radio bearer of relay eNB 104 and the identifier related to the EPS bearer described above. Similarly, relay eNB 104 can store an association between the selected radio bearer of relay eNB 104 and the EPS bearer. In another example, donor eNB 102 can select the radio bearer of relay eNB 104 for the EPS bearer according to the communication class. This can be a static mapping such that relay eNB 104, upon receiving the bearer setup request, can map the same radio bearer of relay eNB 104 to the EPS bearer for subsequent packet forwarding.

In any case, relay eNB 104 can forward the bearer setup request to UE 110, which can establish the requested bearer, and send an establishment response to the core network 106 (via relay eNB 104 and donor eNB 102). Subsequently, for example, donor eNB 102 can receive packets for UE 110 from core network 106. The packets can comprise an identifier for the EPS bearer and/or bearer of UE 110, as described above. In one example, this identifier can be a tunnel endpoint identifier (TEID), which the donor eNB 102 can provide to the core network 106 once it receives the bearer establishment response from UE 110. Donor eNB 102 can match the TEID to a bearer of the relay eNB 104 based on the previously stored association. Donor eNB 102 can accordingly transmit the packet to the indicated bearer, and relay eNB 104 can receive and process the packet. It is to be appreciated that relay eNB 104 can transmit the packet, or a portion thereof, to UE 110 based on a stored association between the TEID (or a portion thereof) and a bearer of UE 110. Similarly, upon receiving a packet from UE 110, relay eNB 104 can determine a bearer over which to send the packet based on determining a bearer of relay eNB 104 associated with the TEID of UE 110/related EPS bearer. In this regard, donor eNB 102 can map multiple EPS bearers to single relay eNB 104 to support connection with a plurality of relay eNBs.

Figure 2:
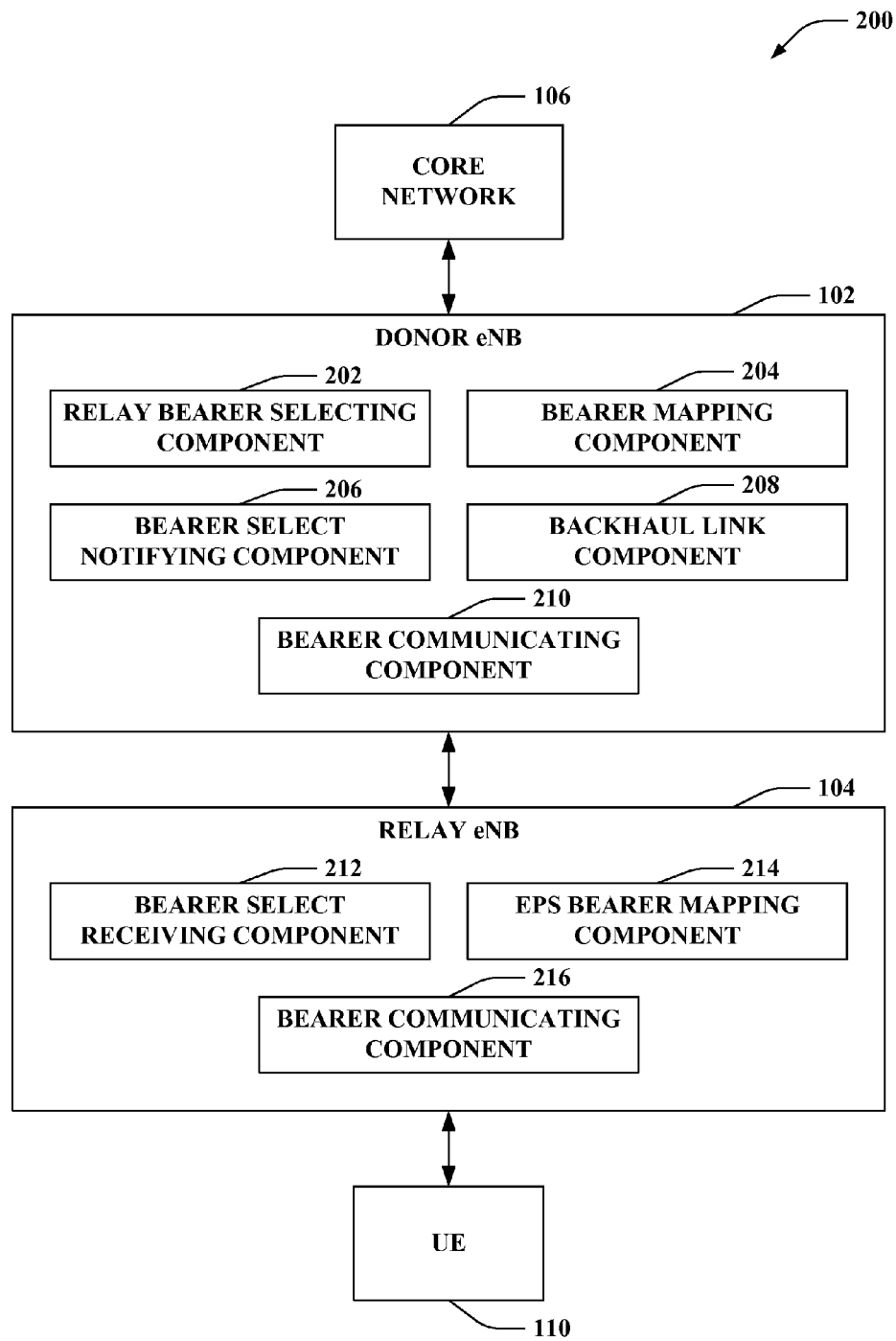
FIG. 2 is an illustration of an example wireless communications system that facilitates mapping multiple evolved packet system (EPS) bearers to downstream relay node radio bearers.

Turning now to FIG. 2, an example wireless communication system 200 that facilitates mapping EPS bearers to cell relay radio bearers is illustrated. System 200 includes a donor eNB 102 that provides relay eNB 104 (and/or other relay eNBs) with access to core network 106. Additionally, as described, relay eNB 104 can provide a UE 110 with access to the core network 106 via donor eNB 102. In one example, there can be multiple relay eNBs 104 between the donor eNB 102 and UE 110. In addition, it is to be appreciated that relay eNB 104 can comprise the components of donor eNB 102 and provide similar functionality, in one example, to additional downstream relay eNBs. Moreover, donor eNB 102 can be a macrocell access point, femtocell access point, picocell access point, mobile base station, and/or the like. Relay eNB 104 can similarly be mobile or stationary relay nodes that communicate with donor eNB 102 over a wireless or wired backhaul, as described.

Donor eNB 102 comprises a relay bearer selecting component 202 that associates an EPS bearer established by the core network 106 to a radio bearer of a relay eNB, a bearer mapping component 204 that stores an association between the EPS bearer and the radio bearer of the relay eNB, a bearer select notifying component 206 that transmits notification of the association between EPS bearer and the radio bearer of the relay eNB, a backhaul link component 208 that communicates with core network 106, and a bearer communicating component 210 that transmits data to a radio bearer of the relay eNB based at least in part on an EPS bearer related to the data and receives data from the radio bearer of the relay eNB.

Relay eNB 104 can include a bearer select receiving component 212 that obtains an association between an EPS bearer and a radio bearer of the relay eNB 104, an EPS bearer mapping component 214 that stores the association, and a bearer communicating component 216 that receives data transmitted over the radio bearer of the relay eNB 104 and transmits data to donor eNB 102 over the radio bearer.

According to an example, core network 106 can generate an EPS bearer for UE 110 and can transmit a request for radio bearer establishment to UE 110 through intermediary nodes. Donor eNB 102 can receive the request for radio bearer establishment related to UE 110. Relay bearer selecting component 202 can select a radio bearer of relay eNB 104 to correspond to the EPS bearer and data transmitted to and from the EPS bearer. In one example, relay bearer selecting component 202 can choose the radio bearer according to a best effort match. In one example, selecting the best effort match can include selecting a bearer of relay eNB 104 that has the least number of mappings to an EPS bearer, a bearer that has a highest quality of service (QoS), a bearer having a throughput above a certain threshold, a bearer that is mapped to similar EPS bearers according to a technology or communication type, and/or the like. The parameters can be measured by donor eNB 102, received from relay eNB 104 or other downstream or upstream network components, etc.

Bearer mapping component 204 can store an association between the EPS bearer and the selected radio bearer of relay eNB 104. As described, the EPS bearer can be identified by an identifier, such as a TEID, that additionally relates to a respective UE 110 bearer. In one example, the identifier can be stored in a routing table provided by the bearer mapping component 204. For example, the routing table can be similar to the following format.

| TEID | Next Downstream Relay eNB ID | Radio Bearer ID |
| --- | --- | --- |
| aaaa | xx | 3 |
| bbbb | xx | 4 |
| cccc | yy | 9 |
| dddd | zz | 3 |
| eeee | yy | 9 |
| ... | ... | ... |

In this example, the TEID can be utilized to identify the EPS bearer and the UE 110 bearer, as described. The TEID can be associated with the EPS bearer and/or corresponding UE 110 bearer according to substantially any type of TEID assignment specification. For example, donor eNB 102 can assign the TEID, or a portion thereof. This can be based on a request from a relay eNB communicating directly with the UE 110 (relay eNB 104, in this example), etc. In another example, relay eNB 104 can assign the TEID, or a portion thereof, to the UE 110 bearer, which can be associated to the EPS bearer by upstream nodes. In this example, relay eNB 104 can provide the TEID to donor eNB 102 (e.g., as part of the radio bearer establishment response described below).

Bearer select notifying component 206 can transmit an indication of the selected relay eNB 104 radio bearer for association to the EPS bearer to relay eNB 104. This can be along with a bearer setup request, in one example. Bearer select receiving component 212 can obtain the notification from donor eNB 102, and EPS bearer mapping component 214 can store an association between the bearer of relay eNB 104 selected by donor eNB 102 and an identifier of the EPS bearer (e.g., TEID, or an identifier related to the corresponding UE 110 bearer, as described above). It is to be appreciated that other intermediary relay eNBs between UE 110 and donor eNB 102 can similarly receive a bearer selection from their direct upstream relay eNB or donor eNB and store an association between that selected bearer and an identifier for the EPS bearer. In this regard, for example, intermediary relay eNBs can comprise the components of donor eNB 102 (e.g., for downstream bearer selection) and components of relay eNB 104 (e.g., for upstream bearer selection receipt) to facilitate such functionality. Relay eNB 104 can subsequently communicate a bearer setup request to UE 110, where received from donor eNB 102, for example.

UE 110 can establish a bearer corresponding to the EPS bearer in the core network 106 and can transmit a bearer establishment response to relay eNB 104. In one example, where relay eNB 104 generates the TEID or at least portion thereof, it can do so based on receiving the bearer establishment response, and EPS bearer mapping component 214 can store an association between the TEID and the bearer of relay eNB 104 selected by donor eNB 102 for the EPS bearer. In addition, it is to be appreciated that relay eNB 104 can store an association of the TEID to the UE bearer for downstream routing. Relay eNB 104 can forward the bearer establishment response to donor eNB 102 (or intermediary relay eNBs, where present); where the relay eNB 104 assigns at least a portion of the TEID, it can also provide the portion to donor eNB 102 (or intermediary relay eNBs). If a TEID is present in the response, bearer mapping component 204 can store the mapping between the TEID and the previously selected bearer of relay eNB 104. Donor eNB 102 can communicate the bearer establishment response to core network 106; it is to be appreciated, for example, that donor eNB 102 can include the TEID in the response forwarding and/or in subsequent packets related to UE 110. Where intermediary relay eNBs are present, they can similarly receive and map the TEID or portion thereof, if present, to the radio bearer and relay eNB identifier, and forward the bearer establishment response to the next upstream relay eNB or donor eNB 102.

Core network 106 can transmit packets relating to the EPS bearer, and thus to UE 110, to donor eNB 102. In one example, the packets can comprise the TEID for routing. In this regard, backhaul link component 208 can receive the data, and bearer mapping component 204 can determine the radio bearer of relay eNB 104 related to the EPS bearer (e.g., according to the TEID) based on the previously stored associations. Bearer communicating component 210 can transmit the packets to the selected radio bearer of relay eNB 104 (or intermediary relay eNBs) based on determining an identifier of the relay eNB 104 as the next downstream relay eNB and the respective bearer associated to the TEID. Bearer communicating component 216 can receive the bearer communication from donor eNB 102. It is to be appreciated that relay eNB 104 can route the packet to UE 110 based on a routing table for UE bearers, as described.

In another example, UE 110 can communicate data for the EPS bearer to relay eNB 104. EPS bearer mapping component 214 can determine a bearer over which to communicate the data to core network 106 (via donor eNB 102 and/or other intermediary relay eNBs, where present) based on the stored associations, as described. Bearer communicating component 216 can transmit the data over the bearer to donor eNB 102. Bearer communicating component 210 can receive the data, and backhaul link component 208 can communicate the data to core network 106 (e.g., along with the TEID, for example). It is to be appreciated that donor eNB 102 can communicate with core network 106 over a disparate transport layer, as described, such that backhaul link component 208 can also manipulate received packets to include an intended payload in a newly created transport packet. Similarly, upon receiving packets from core network 106, backhaul link component 208, in one example, can formulate disparate transport layer packets for transmitting a payload in the received packet over bearer communicating component 210.

Figure 3:
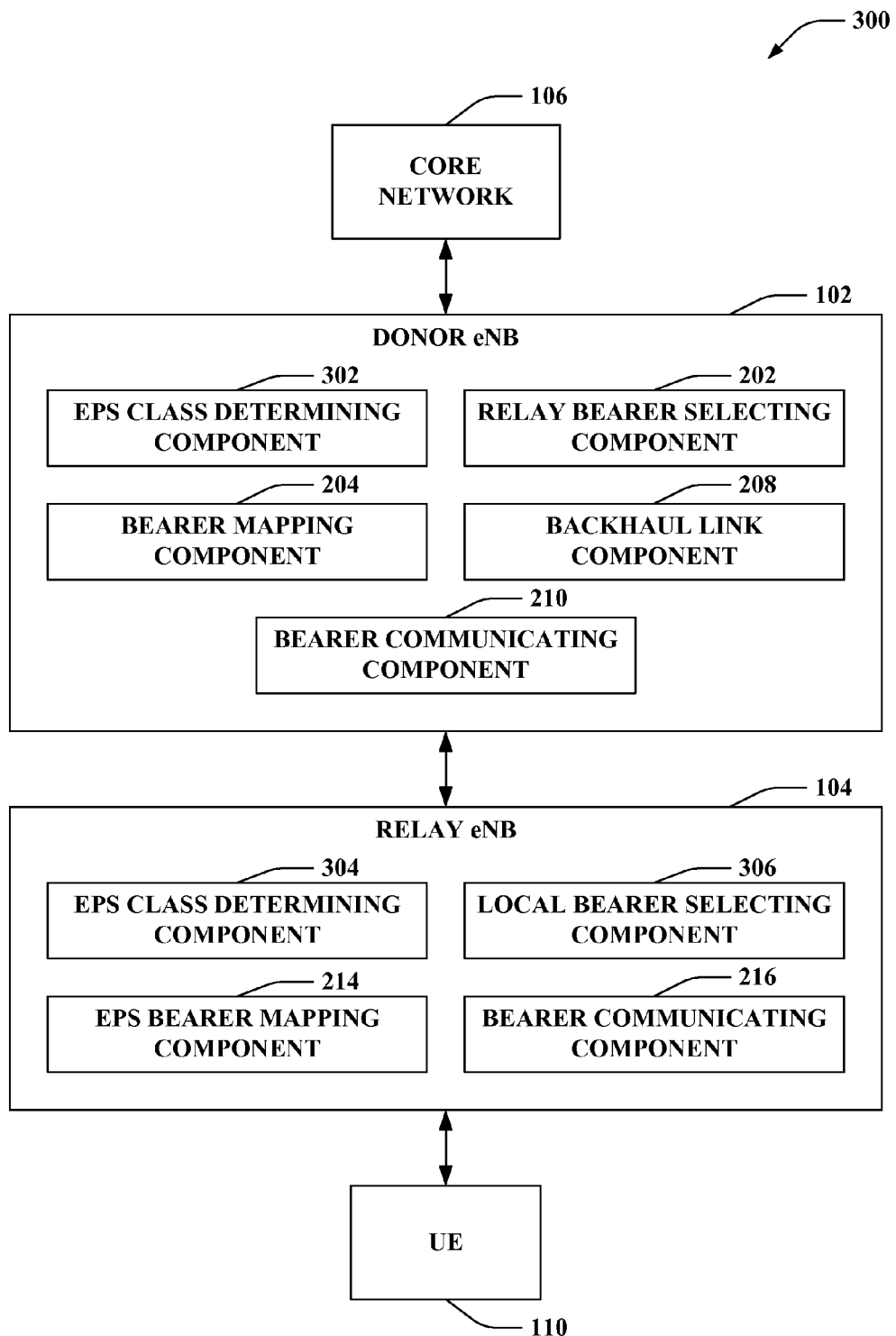
FIG. 3 is an illustration of an example wireless communications system that maps multiple EPS bearers to downstream relay node radio bearers based on class identifiers of the EPS bearers.

Turning now to FIG. 3, an example wireless communication system 300 that facilitates mapping EPS bearers to cell relay radio bearers based on communication class of the EPS bearers is illustrated. System 300 includes a donor eNB 102 that provides relay eNB 104 (and/or other relay eNBs) with access to core network 106. Additionally, as described, relay eNB 104 can provide a UE 110 with access to the core network 106 via donor eNB 102. In one example, there can be multiple relay eNBs 104 between the donor eNB 102 and UE 110. In addition, it is to be appreciated that relay eNB 104 can comprise the components of donor eNB 102 and provide similar functionality, in one example, to additional downstream relay eNBs. Moreover, donor eNB 102 can be a macrocell access point, femtocell access point, picocell access point, mobile base station, and/or the like. Relay eNB 104 can similarly be mobile or stationary relay nodes that communicate with donor eNB 102 over a wireless or wired backhaul, as described.

Donor eNB 102 comprises an EPS class determining component 302 that discerns a communication class of an EPS bearer initialized by core network 106, a relay bearer selecting component 202 that associates an EPS bearer established by the core network 106 to a radio bearer of a relay eNB based on the communication class of the EPS bearer, a bearer mapping component 204 that stores an association between the EPS bearer and the radio bearer of the relay eNB, a backhaul link component 208 that communicates with core network 106, and a bearer communicating component 210 that transmits data to a radio bearer of the relay eNB based at least in part on an EPS bearer related to the data and receives data from the radio bearer of the relay eNB.

Relay eNB 104 can similarly include an EPS class determining component 304 that obtains a communication class of an EPS bearer for which setup is requested, a local bearer selecting component 306 that maps a local radio bearer of the relay eNB 104 to the EPS bearer based on the communication class, an EPS bearer mapping component 214 that stores an association between the EPS bearer and a selected relay eNB 104 bearer, and a bearer communicating component 216 that receives data transmitted over the radio bearer of the relay eNB 104 and transmits data to donor eNB 102 over the radio bearer.

According to an example, core network 106 can generate an EPS bearer for UE 110 and can transmit a request for radio bearer establishment to UE 110 through intermediary nodes. Donor eNB 102 can receive the request for radio bearer establishment related to UE 110. Relay bearer selecting component 202 can select a radio bearer of relay eNB 104 to correspond to the EPS bearer and data transmitted to and from the EPS bearer. In one example, relay bearer selecting component 202 can choose the radio bearer according to a class of communications related to the EPS bearer. In this example, EPS class determining component 302 can discern the class of the EPS bearer, which can be based at least in part on QCI related to the EPS bearer received from core network 106. In one example, the classes of EPS bearer can be at least one of the following.

| QCI | Resource Type | Priority | Packet Delay Budget | Packet Error Loss Rate | Example Services |
|---|---|---|---|---|---|
| 1 | guaranteed bit rate (GBR) | 2 | 100 ms | $10^{-2}$ | Conversational Voice |
| 2 |  | 4 | 150 ms | $10^{-3}$ | Conversational Video (Live Streaming) |
| 3 |  | 5 | 300 ms | $10^{-6}$ | Non-Conversational Video (Buffered Streaming) |
| 4 |  | 3 | 50 ms | $10^{-3}$ | Real Time Gaming |
| 5 | Non-GBR | 1 | 100 ms | $10^{-6}$ | IMS Signalling |
| 6 |  | 7 | 100 ms | $10^{-3}$ | Voice, Video (Live Streaming) Interactive Gaming |
| 7 |  | 6 | 300 ms | $10^{-6}$ | Video (Buffered Streaming) TCP-based (e.g., www, e-mail, chat, ftp, p2p file sharing, progressive video, etc.) |
| 8 |  | 8 |  |  |  |
| 9 |  | 9 |  |  |  |

The QCI can be received from core network 106 in a bearer setup request related to the EPS bearer.

Bearer mapping component 204 can store an association between the EPS bearer and the radio bearer of relay eNB 104 selected according to the EPS bearer communication class. As described, the EPS bearer can be identified by an identifier, such as a TEID, that can additionally relate to a respective UE 110 bearer. In one example, the identifier can be stored in a routing table provided by the bearer mapping component 204. For example, the routing table can be similar to the following format.

| TEID | EPS QCI | Next Downstream Relay eNB ID | Radio Bearer ID |
|---|---|---|---|
| aaaa | 1 | xx | 3 |
| bbbb | 1 | xx | 3 |
| cccc | 2 | yy | 9 |
| dddd | 9 | zz | 4 |
| eeee | 2 | yy | 9 |
| ... |  | ... | ... |

In this example, the TEID can be utilized to identify the EPS bearer/UE 110 bearer, as described. The TEID can be associated with the EPS bearer and/or corresponding UE 110 bearer according to substantially any type of TEID assignment specification, as described previously.

Donor eNB 102 can forward the bearer setup request to relay eNB 104. EPS class determining component 304 can similarly discern a communication class for the EPS bearer (e.g., according to QCI received in the bearer setup request). Local bearer selecting component 306 can choose a local radio bearer for mapping to the EPS bearer based on the communication class of the EPS bearer. This can be according to a static mapping, as described, such that donor eNB 102 and relay eNB 104 map to the same radio bearer of relay eNB 104. EPS bearer mapping component 214 can store an association between the selected radio bearer of relay eNB 104 and an identifier of the EPS bearer (e.g., TEID, or an identifier related to the corresponding UE 110 bearer, as described above). It is to be appreciated that other intermediary relay eNBs between UE 110 and donor eNB 102, where present, can similarly receive QCI information for an EPS bearer in forwarded bearer setup requests, select a local radio bearer over which to communicate data related to the EPS bearer based on the QCI information, and store an association between the selected bearer and an identifier for the EPS bearer. In this regard, intermediary relay eNBs can comprise the components of relay eNB 104 (e.g., for bearer selection according to received QCI information), for example. Relay eNB 104 can subsequently communicate a bearer setup request to UE 110, where received from donor eNB 102, for example.

UE 110 can establish a bearer corresponding to the EPS bearer in the core network 106 and can transmit a bearer establishment response to relay eNB 104. In one example, where relay eNB 104 generates the TEID or at least portion thereof, it can do so based on receiving the bearer establishment response, and EPS bearer mapping component 214 can store an association between the TEID and the bearer of relay eNB 104 selected according to the EPS bearer communication class. In addition, it is to be appreciated that relay eNB 104 can store an association of the TEID to the UE bearer for downstream routing. Relay eNB 104 can forward the bearer establishment response to donor eNB 102 (or intermediary relay eNBs, where present); where the relay eNB 104 assigns at least a portion of the TEID, it can also provide the portion to donor eNB 102 (or intermediary relay eNBs). If a TEID is present in the response, bearer mapping component 204 can store the mapping between the TEID and the previously selected bearer of relay eNB 104. Donor eNB 102 can communicate the bearer establishment response to core network 106; it is to be appreciated, for example, that donor eNB 102 can include the TEID in the response forwarding and/or in subsequent packets related to UE 110. Where intermediary relay eNBs are present, they can similarly receive and map the TEID or portion thereof, if present, to the radio bearer and relay eNB identifier, and forward the bearer establishment response to the next upstream relay eNB or donor eNB 102.

Core network 106 can transmit packets relating to the EPS bearer, and thus to UE 110, to donor eNB 102. In one example, the packets can comprise the corresponding TEID for routing. In this regard, backhaul link component 208 can receive the data, and bearer mapping component 204 can determine the radio bearer of relay eNB 104 related to the EPS bearer based on the previously stored associations. Bearer communicating component 210 can transmit the packets to the selected radio bearer of relay eNB 104 (or intermediary relay eNBs) based on determining an identifier of the relay eNB 104 as the next downstream relay eNB and the respective bearer associated to the TEID. Bearer communicating component 216 can receive the bearer communication from donor eNB 102. It is to be appreciated that relay eNB 104 can route the packet to UE 110 based on a routing table for UE bearers, as described.

In another example, UE 110 can communicate data for the EPS bearer to relay eNB 104. EPS bearer mapping component 214 can determine a bearer over which to communicate the data to core network 106 (via donor eNB 102 and/or other intermediary relay eNBs, where present) based on the stored associations, as described. Bearer communicating component 216 can transmit the data over the bearer to donor eNB 102. Bearer communicating component 210 can receive the data, and backhaul link component 208 can communicate the data to core network 106 (e.g., along with the TEID, for example). It is to be appreciated that donor eNB 102 can communicate with core network 106 over a disparate transport layer, as described, such that backhaul link component 208 can also manipulate received packets to include an intended payload in a newly created transport packet. Similarly, upon receiving packets from core network 106, backhaul link component 208, in one example, can formulate disparate transport layer packets for transmitting a payload in the received packet over bearer communicating component 210.

Figure 4:
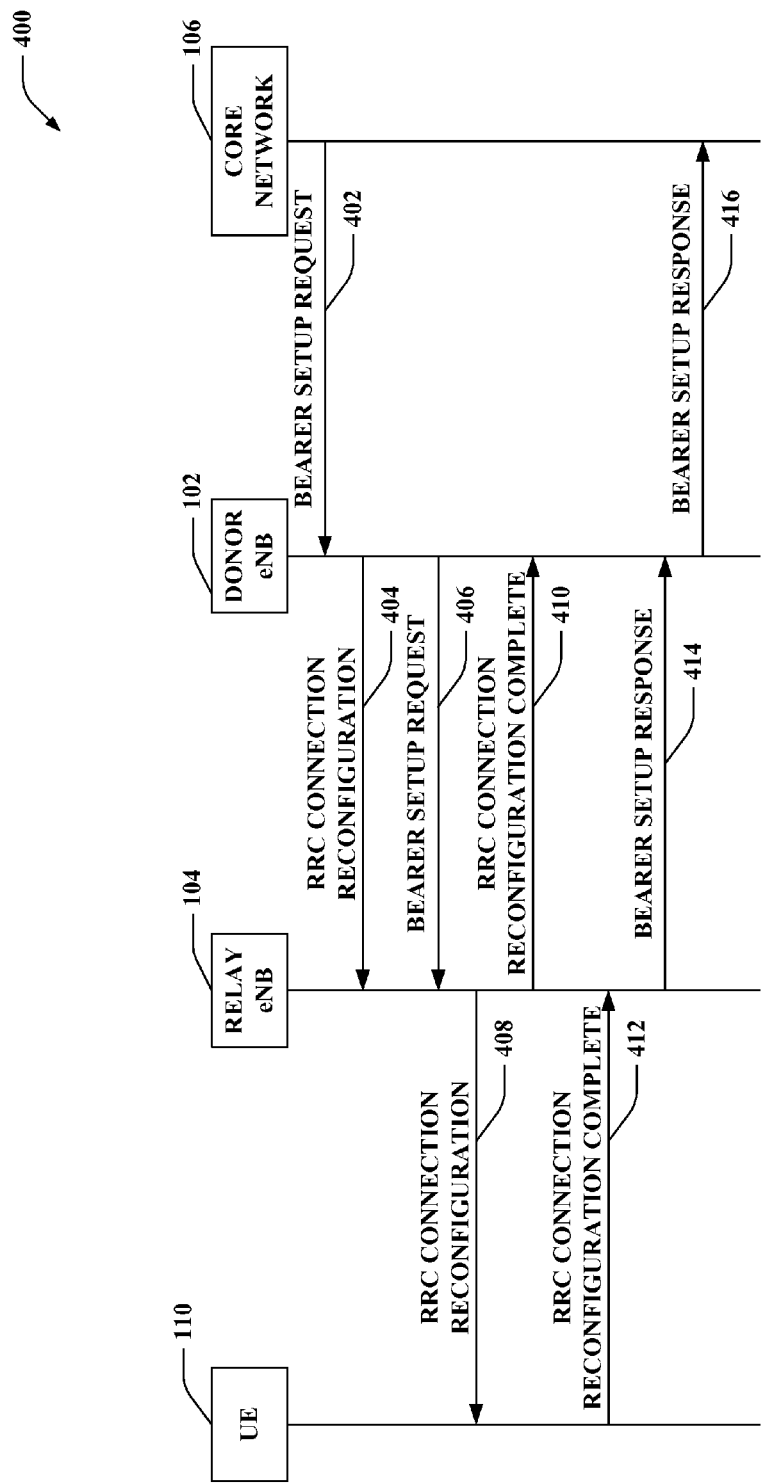
FIG. 4 is an illustration of an example wireless communications system that facilitates associating multiple EPS bearers with a radio bearer of a relay eNB.

Turning now to FIG. 4, an example wireless communication system 400 that facilitates mapping EPS bearers to downstream relay radio bearers is illustrated. System 400 includes a donor eNB 102 that provides relay eNB 104 (and/or other relay eNBs) with access to core network 106. Additionally, as described, relay eNB 104 can provide a UE 110 with access to the core network 106 via donor eNB 102. In one example, there can be multiple relay eNBs 104 between the donor eNB 102 and UE 110. In addition, it is to be appreciated that relay eNB 104 can provide similar functionality as donor eNB 102, in one example, to additional downstream relay eNBs. Moreover, donor eNB 102 can be a macrocell access point, femtocell access point, picocell access point, mobile base station, and/or the like. Relay eNB 104 can similarly be mobile or stationary relay nodes that communicate with donor eNB 102 over a wireless or wired backhaul, as described.

According to an example, core network 106 can transmit a bearer setup request 402 to donor eNB 102 comprising one or more parameters regarding an EPS bearer. Core network 106 can transmit the request 402 over a backhaul link to the donor eNB 102, in one example. A component from the core network 106, such as an MME, can forward the request, which can initiate at a SGW/PGW, for example. In addition, the request can be in response to a prior request for services from UE 110, such as a request for a voice bearer, video bearer, gaming bearer, and/or the like, as described. Donor eNB 102 can select a radio bearer of relay eNB 104 for mapping to the EPS bearer. As described, this can be based on best efforts, QCI related to the EPS bearer (which can be received in the bearer setup request 402, for example), and/or the like. Donor eNB 102 can subsequently transmit an RRCConnectionReconfiguration message 404 and a bearer setup request 406 to relay eNB 104.

Where donor eNB 102 selects the relay eNB 104 radio bearer based on best efforts, for example, donor eNB 102 can include the selection in the RRCConnectionReconfiguration 404 or the bearer setup request 406. Relay eNB 104 can forward the RRCConnectionReconfiguration 408 to UE 110, for example, and can acknowledge the radio bearer selection by donor eNB 102 by transmitting RRCConnectionReconfigurationComplete message 410 to donor eNB 102. Where the EPS bearer is determined based on QCI, for example, donor eNB 102 can forward the QCI information to relay eNB 104 in the RRCConnectionReconfiguration 404 or bearer setup request 406. In this example, once relay eNB 104 has determined the local bearer related to the QCI information, as described, relay eNB 104 can transmit RRCConnectionReconfigurationComplete 410 to the donor eNB 102.

In either example, where there are intermediary relay eNBs between relay eNB 104 and donor eNB 102, each intermediary relay eNB can similarly receive the bearer selection from the upstream eNB or determine the selection based on QCI and store an association between the EPS and the received bearer selection. The intermediary relay eNBs can also select a downstream relay eNB bearer for the EPS bearer (e.g., based on best effort match or QCI), store a mapping of the EPS bearer to the downstream relay eNB bearer, and notify the downstream relay eNB of the selection, or forward QCI information thereto, much like donor eNB 102. In any case, UE can transmit an RRCConnectionReconfigurationComplete 412 to relay eNB 104, and relay eNB 104 can indicate a bearer setup response 414 to donor eNB, which can similarly indicate a bearer setup response to 416.

As described, the messages can additionally be utilized to pass TEID for a UE 110 related bearer or corresponding EPS bearer across the various nodes. For example, where donor eNB 102 assigns at least a portion of the TEID, it can pass the portion to relay eNB 104 in the RRCConnectionReconfiguration 404 or bearer setup request 406. Where intermediary relay eNBs are present, as described, they can similarly receive the TEID portion and pass it downstream in similar messages. In addition, where relay eNB 104 generates at least a portion of a TEID, it can pass the TEID portion in RRCConnectionReconfigurationComplete 412 or bearer setup response 414 messages. Upstream relay eNBs can similarly pass the portion of the TEID to their upstream eNBs. In this regard, each relay eNB and donor eNB can associate the TEID with the EPS bearer, downstream eNB bearers, and upstream eNB bearers, where applicable, to support routing of packets to appropriate bearers, as described.

Figure 5:
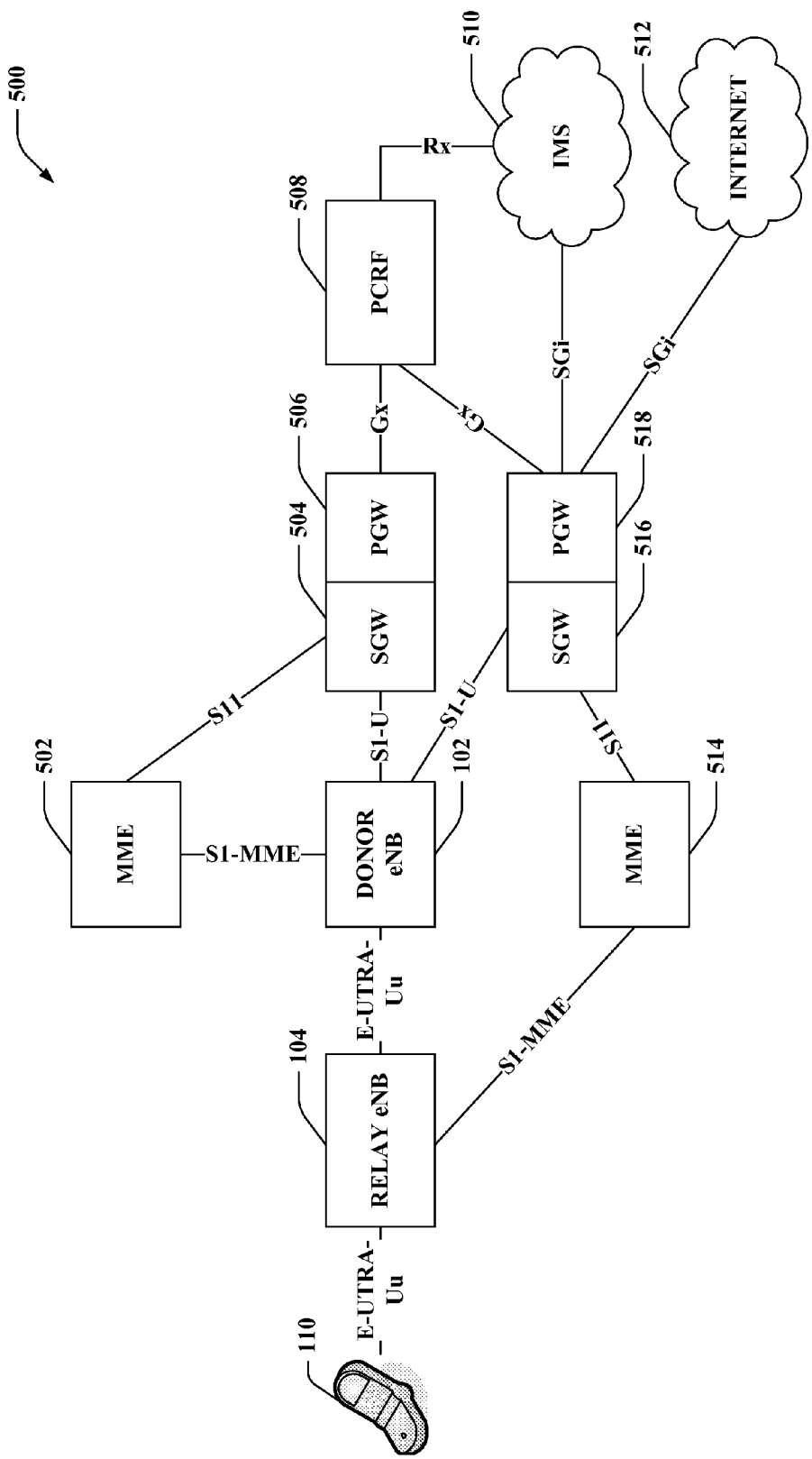
FIG. 5 is an illustration of an example wireless communications system that utilizes cell relays to provide access to a wireless network.

Now turning to FIG. 5, an example wireless communication network 500 that provides cell relay functionality is depicted. Network 500 includes a UE 110 that communicates with a relay eNB 104, as described, to receive access to a wireless network. Relay eNB 104 can communicate with a donor eNB 102 to provide access to a wireless network, and as described, donor eNB 102 can communicate with an MME 502 and/or SGW 504 that relate to the relay eNB 104. SGW 504 can connect to or be coupled with a PGW 506, which provides network access to SGW 504 and/or additional SGWs. PGW 506 can communicate with a PCRF 508 to authenticate/authorize UE 110 to use the network, which can utilize an IMS 510 to provide addressing to the UE 110 and/or relay eNB 104.

According to an example, MME 502 and/or SGW 504 and PGW 506 can be related to donor eNB 102 serving substantially all relay eNBs in the cluster. Donor eNB 102 can also communicate with an SGW 516 and PGW 518 that relate to the UE 110, such that the PGW 518 can assign UE 110 a network address to facilitate tunneling communications thereto through the relay eNB 104, donor eNB 102, and SGW 516. Moreover, for example, SGW 516 can communicate with an MME 514 to facilitate control plane communications to and from the UE 110. It is to be appreciated that MME 502 and MME 514 can be the same MME, in one example. PGW 518 can similarly communicate with a PCRF 508 to authenticate/authorize UE 110, which can communicate with an IMS 510. In addition, PGW 518 can communicate directly with the IMS 510 and/or internet 512.

In an example, UE 110 can communicate with the relay eNB 104 over an E-UTRA-Uu interface, as described, and the relay eNB 104 can communicate with the donor eNB 102 using an E-UTRA-Uu interface or other interface. Donor eNB 102 communicates with the MME 502 using an S1-MME interface and the SGW 504 and PGW 506 over an S1-U interface, as depicted. The transport layers used over the S1-MME and S1-U interfaces are terminated at the donor eNB 102, as described. In this regard, upon receiving communications for the relay eNB 104 from the MME 502 or SGW 504, donor eNB 102 decouples the application layer from the transport layer by defining a new transport layer packet and transmitting the application layer communication to the relay eNB 104 in the new transport layer packet (over the E-UTRA-Uu interface, in one example).

Upon transmitting control plane communications from the relay eNB 104 to the MME 502, donor eNB 102 can indicate an identifier of the relay eNB 104 (e.g., in an S1-AP message), and MME 502 can transmit the identifier in responding communications to the donor eNB 102. When transmitting data plane communications from relay eNB 104 to SGW 504, donor eNB 102 can insert an identifier for the relay eNB 104 (or UE 110 or one or more related bearers) in the TEID of a GTP-U header or in another protocol parameter to identify the relay eNB 104 (or UE 110 or one or more related bearers). SGW 504 can transmit the TEID in a responding GTP-U header such that donor eNB 102 can determine the relay eNB 104, or one or more downstream relay eNBs is to receive the translated packet, as described above. For example, this can be based at least in part on locating at least a portion of the TEID in a routing table at donor eNB 102. In addition, headers can be compressed, in one example, as described. As shown, MME 502 can communicate with SGW 504, and MME 514 to SGW 516, using an S11 interface. PGWs 506 and 518 can communicate with PCRF 508 over a Gx interface. Furthermore, PCRF 508 can communicate with IMS 510 using an Rx interface, and PGW 518 can communicate with IMS 510 and/or the internet 512 using an SGi interface.

Figure 6:
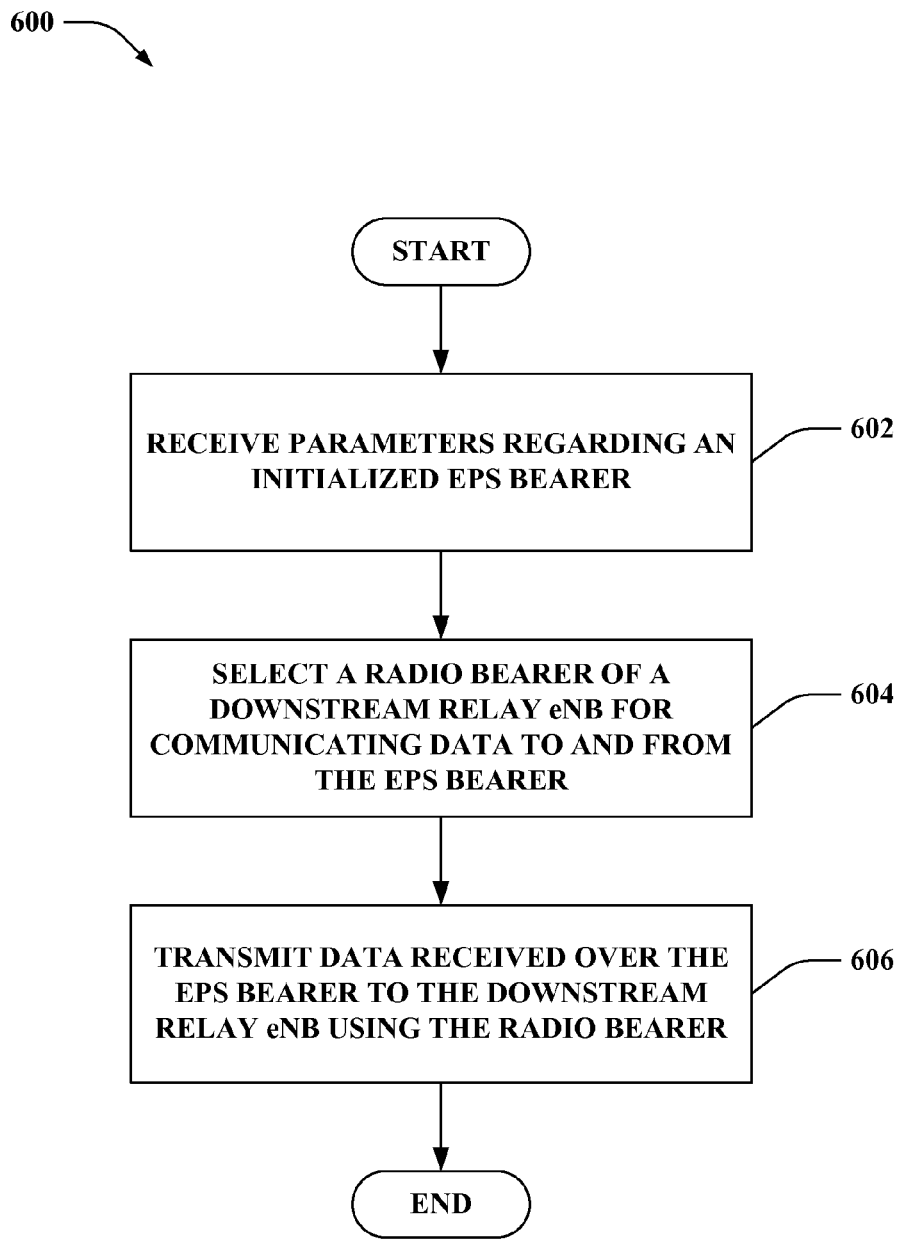
FIG. 6 is an illustration of an example methodology for assigning a downstream relay eNB radio bearer to an EPS bearer.
Figure 7:
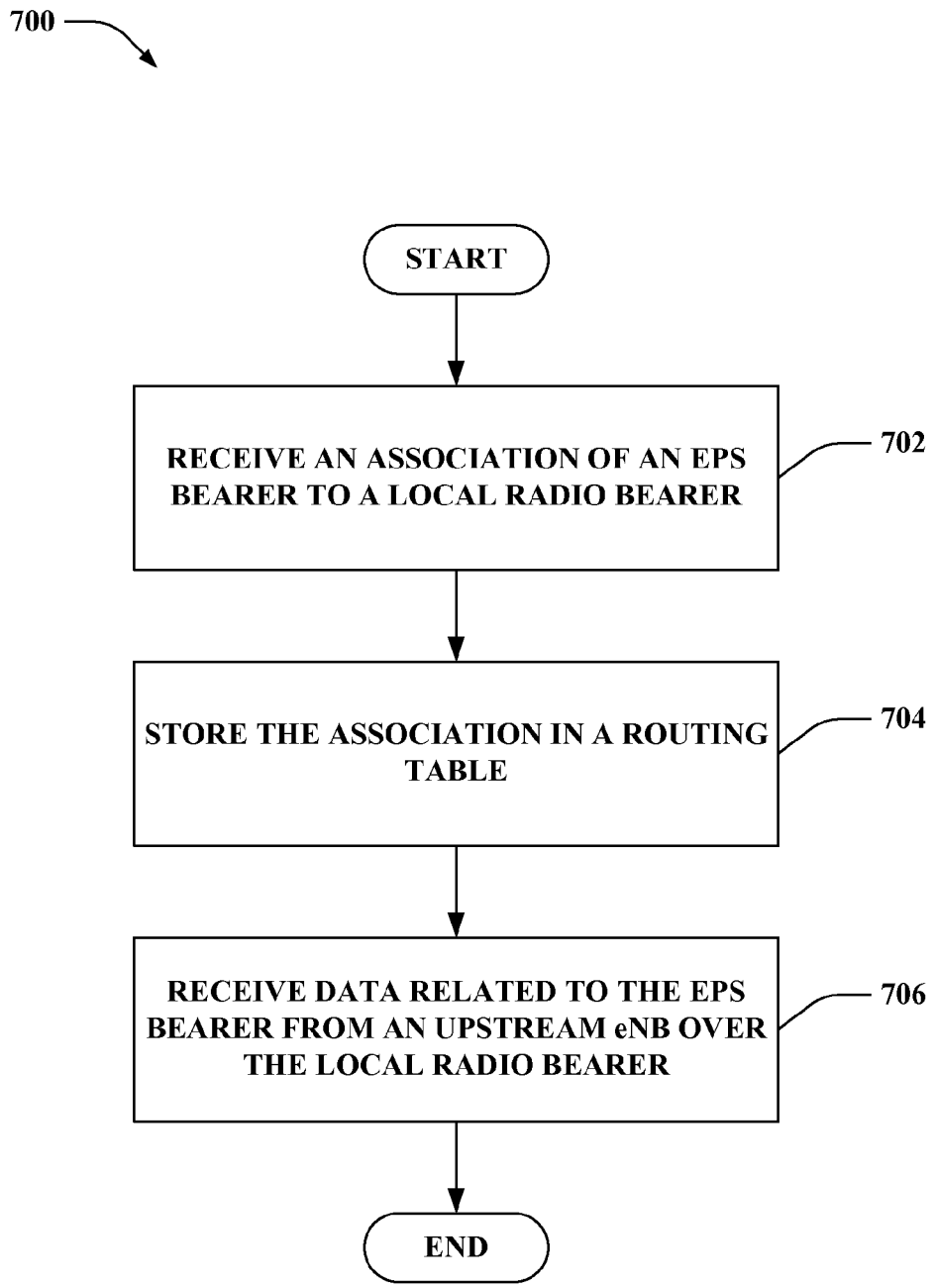
FIG. 7 is an illustration of an example methodology that receives an assignment of a local radio bearer to an EPS bearer.
Figure 8:
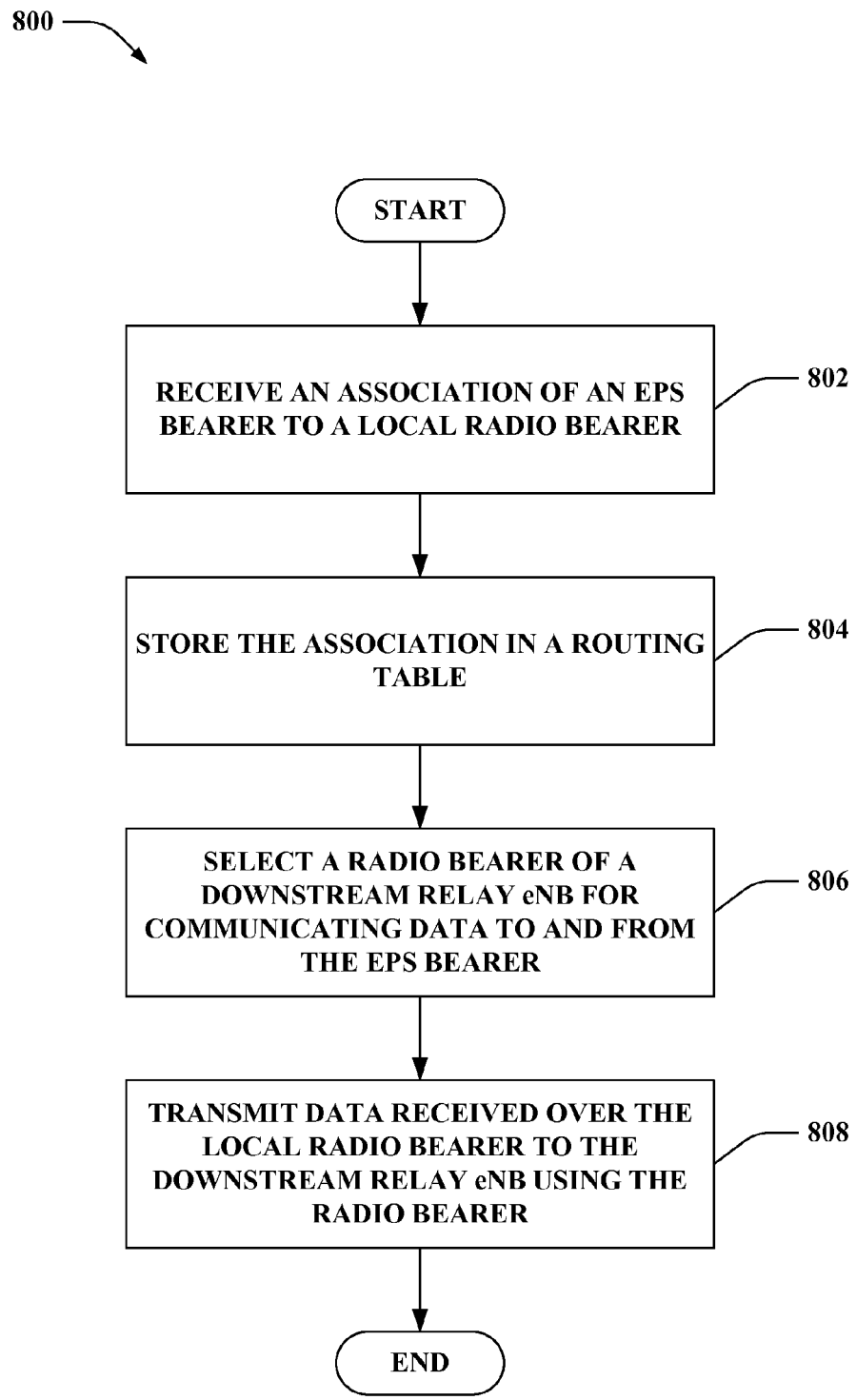
FIG. 8 is an illustration of an example methodology that receives assignments of local radio bearers to EPS bearers and selects radio bearers of downstream relay eNBs for association with the EPS bearer.

Referring to FIGS. 6-8, methodologies relating to mapping multiple EPS bearers to single downstream relay eNB radio bearers are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 6, an example methodology 600 that facilitates selecting downstream relay eNB radio bearers for mapping to EPS bearers is illustrated. At 602, parameters regarding an initialized EPS bearer can be received. As described, for example, the parameters can be received from a core network or an upstream eNB and can indicate the initialization of the EPS bearer, QCI parameters related thereto, and/or the like. At 604, a radio bearer of a downstream relay eNB can be selected for communicating data to and from the EPS bearer. The radio bearer can be selected according to a best effort match, for example, based on one or more parameters related to the radio bearers. In another example, the radio bearer can be selected based on QCI of the EPS bearer, as described. At 606, data received over the EPS bearer can be transmitted to the downstream relay eNB using the radio bearer. As described, the selected radio bearer can be stored in a routing table along with an identifier related to the EPS bearer (or a corresponding UE bearer), as described. Thus, the routing table can be consulted when determining the radio bearer over which to transmit the EPS bearer data.

Referring to FIG. 7, an example methodology 700 is shown that facilitates receiving local radio bearer information corresponding to an EPS bearer. At 702, an association of an EPS bearer to a local radio bearer can be received. In one example, the association can be received from an upstream eNB that selects the local radio bearer. In another example, the association can be determined based at least in part on a received QCI of the EPS bearer, as described. At 704, the association can be stored in a routing table. As described, this can facilitate subsequent routing of packets to an upstream eNB over the local radio bearer. At 706, data related to the EPS bearer can be received from an upstream eNB over the local radio bearer. Thus, the local radio bearer facilitates communicating data to and from the EPS bearer.

Turning to FIG. 8, an example methodology 800 that facilitates receiving a local radio bearer assignment to an EPS bearer and selecting a downstream relay eNB radio bearer for association to the EPS bearer is illustrated. At 802, an association of an EPS bearer to a local radio bearer can be received. As described, this can be received from a core network component or upstream eNB, and the association can be stored in a routing table at 804 for subsequent packet routing. At 806, a radio bearer of a downstream relay eNB can be selected for communicating data to and from the EPS bearer. As described, this can be selected based on a best effort match, a received QCI of the EPS bearer, and/or the like. At 808, data received over the local radio bearer can be transmitted to the downstream relay eNB using the radio bearer.

It will be appreciated that, in accordance with one or more aspects described herein, inferences can be made regarding selecting the radio bearer for an EPS bearer according to a best effort match, and/or other aspects described herein. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
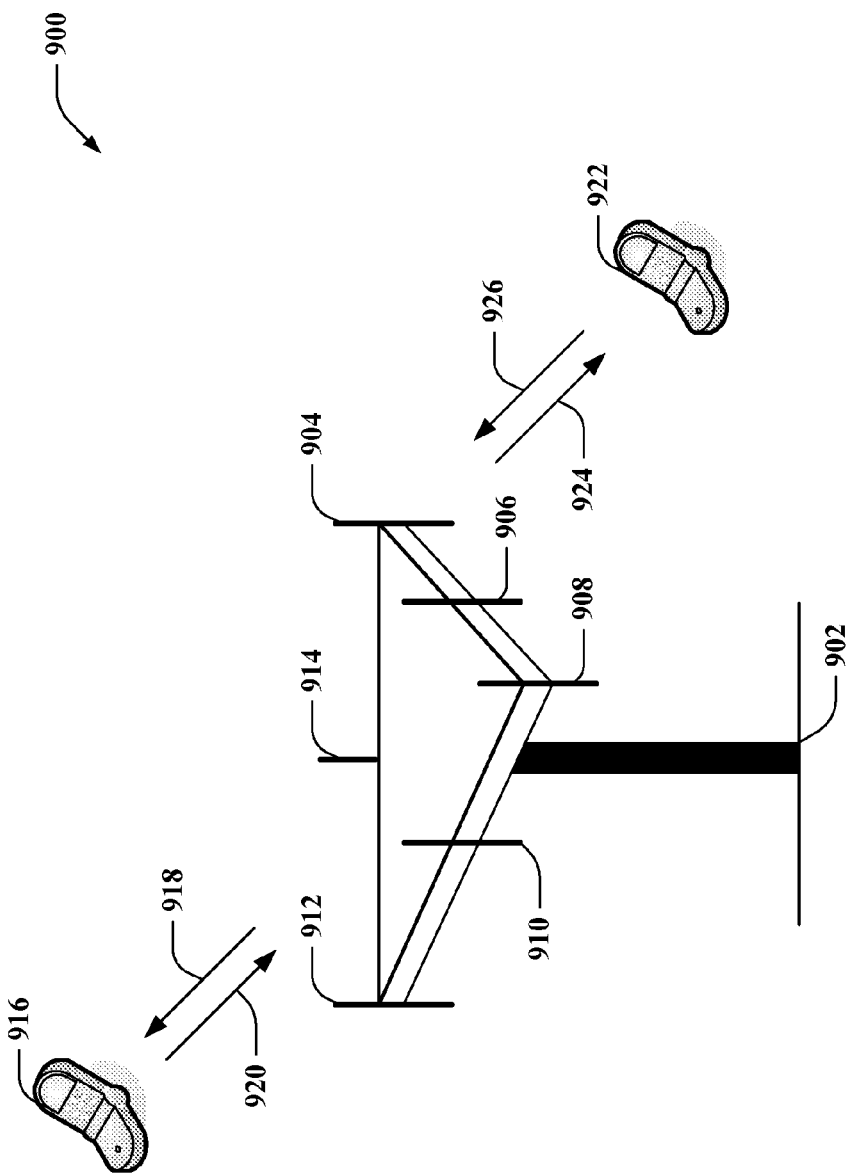
FIG. 9 is an illustration of a wireless communication system in accordance with various aspects set forth herein.

Referring now to FIG. 9, a wireless communication system 900 is illustrated in accordance with various embodiments presented herein. System 900 comprises a base station 902 that can include multiple antenna groups. For example, one antenna group can include antennas 904 and 906, another group can comprise antennas 908 and 910, and an additional group can include antennas 912 and 914. Two antennas are illustrated for each antenna group; however, more or fewer antennas can be utilized for each group. Base station 902 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 902 can communicate with one or more mobile devices such as mobile device 916 and mobile device 922; however, it is to be appreciated that base station 902 can communicate with substantially any number of mobile devices similar to mobile devices 916 and 922. Mobile devices 916 and 922 can be, for example, cellular phones, smart phones, laptops, handheld communication devices, handheld computing devices, satellite radios, global positioning systems, PDAs, and/or any other suitable device for communicating over wireless communication system 900. As depicted, mobile device 916 is in communication with antennas 912 and 914, where antennas 912 and 914 transmit information to mobile device 916 over a forward link 918 and receive information from mobile device 916 over a reverse link 920. Moreover, mobile device 922 is in communication with antennas 904 and 906, where antennas 904 and 906 transmit information to mobile device 922 over a forward link 924 and receive information from mobile device 922 over a reverse link 926. In a frequency division duplex (FDD) system, forward link 918 can utilize a different frequency band than that used by reverse link 920, and forward link 924 can employ a different frequency band than that employed by reverse link 926, for example. Further, in a time division duplex (TDD) system, forward link 918 and reverse link 920 can utilize a common frequency band and forward link 924 and reverse link 926 can utilize a common frequency band.

Each group of antennas and/or the area in which they are designated to communicate can be referred to as a sector of base station 902. For example, antenna groups can be designed to communicate to mobile devices in a sector of the areas covered by base station 902. In communication over forward links 918 and 924, the transmitting antennas of base station 902 can utilize beamforming to improve signal-to-noise ratio of forward links 918 and 924 for mobile devices 916 and 922. Also, while base station 902 utilizes beamforming to transmit to mobile devices 916 and 922 scattered randomly through an associated coverage, mobile devices in neighboring cells can be subject to less interference as compared to a base station transmitting through a single antenna to all its mobile devices. Moreover, mobile devices 916 and 922 can communicate directly with one another using a peer-to-peer or ad hoc technology (not shown).

According to an example, system 900 can be a multiple-input multiple-output (MIMO) communication system. Further, system 900 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 902 can communicate to the mobile devices 916 and 922 over the channels, which can be create for various types of data. For example, channels can be created for communicating various types of general communication data, control data (e.g., quality information for other channels, acknowledgement indicators for data received over channels, interference information, reference signals, etc.), and/or the like.

Figure 10:
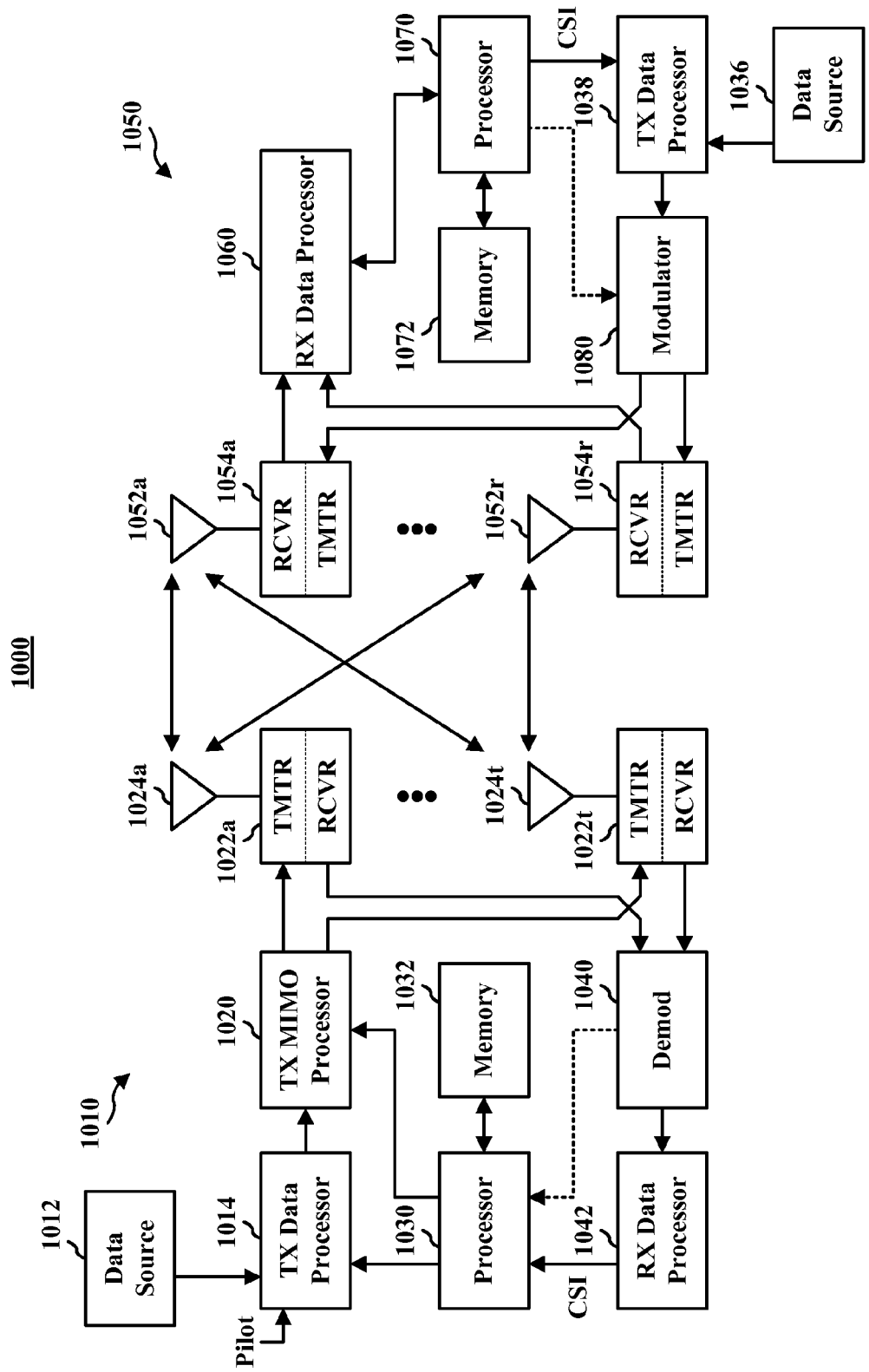
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1-5 and 9) and/or methods (FIGS. 6-8) described herein to facilitate wireless communication therebetween.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various aspects, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
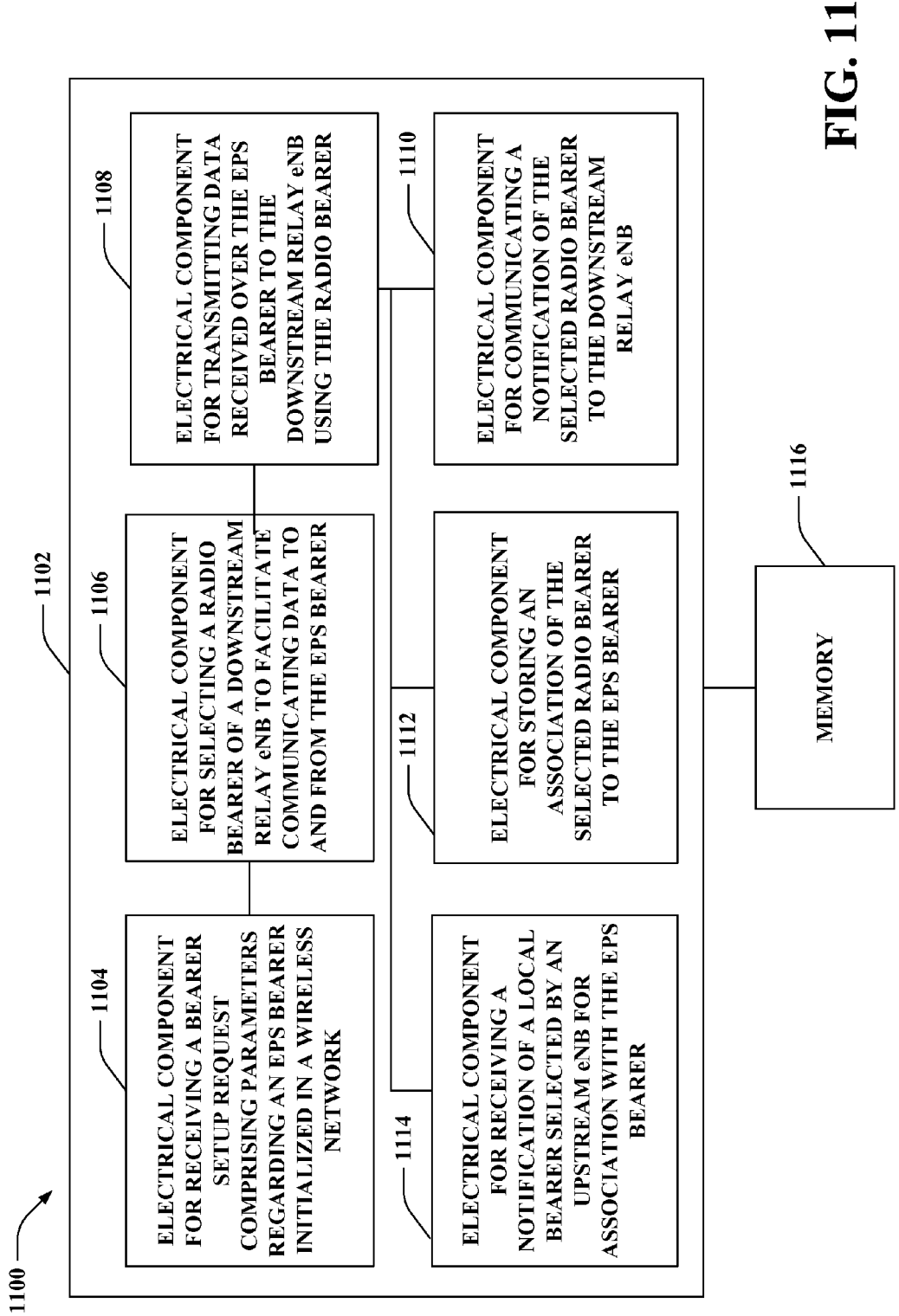
FIG. 11 is an illustration of an example system that selects a downstream relay eNB radio bearer for associating to an EPS bearer.

With reference to FIG. 11, illustrated is a system 1100 that facilitates selecting relay eNB radio bearers to correspond to multiple EPS bearers. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving a bearer setup request comprising parameters regarding an EPS bearer initialized in a wireless network 1104. In an example, the parameters can include an indication of initialization, QCI for the EPS bearer, and/or the like. Additionally, logical grouping 1102 can include an electrical component for selecting a radio bearer of a downstream relay eNB to facilitate communicating data to and from the EPS bearer 1106. In one example, electrical component 1106 can select the radio bearer based on a best effort match, QCI of the EPS bearer, and/or the like, as described. Moreover, logical grouping 1102 can include an electrical component for transmitting data received over the EPS bearer to the downstream relay eNB using the radio bearer 1108.

In addition, logical grouping 1102 can include an electrical component for communicating a notification of the selected radio bearer to the downstream relay eNB 1110. This can be as part of a bearer setup request message and/or the like, as described. Moreover, logical grouping 1102 can include an electrical component for storing an association of the selected radio bearer to the EPS bearer 1112. In one example, the association can be stored in a routing table, which electrical component 1108 can utilize for determining the proper radio bearer over which to transmit EPS bearer data. Further, logical grouping 1102 can include an electrical component for receiving a notification of a local bearer selected by an upstream eNB for association with the EPS bearer 1114. Additionally, system 1100 can include a memory 1116 that retains instructions for executing functions associated with electrical components 1104, 1106, 1108, 1110, 1112, and 1114. While shown as being external to memory 1116, it is to be understood that one or more of electrical components 1104, 1106, 1108, 1110, 1112, and 1114 can exist within memory 1116.

Figure 12:
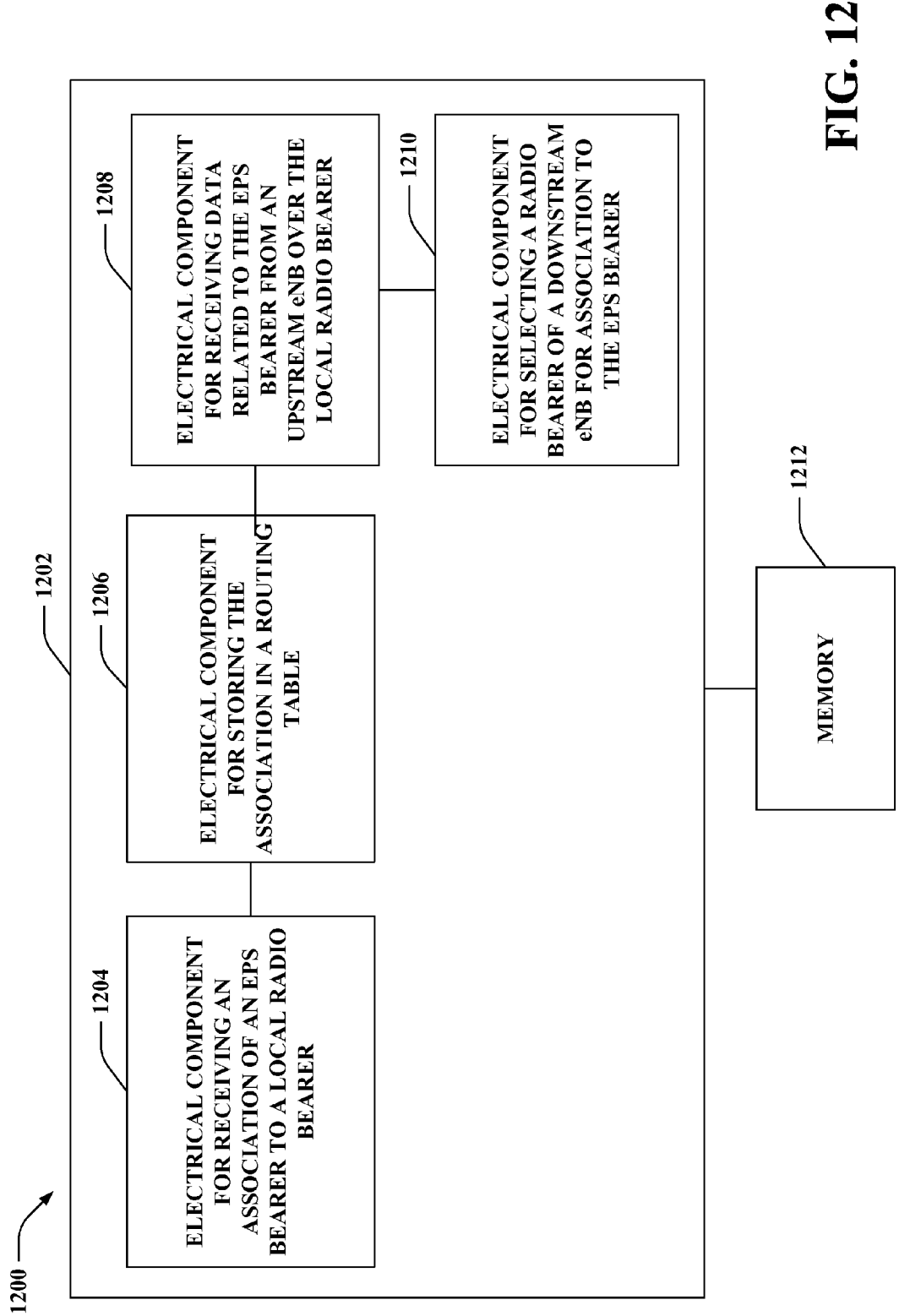
FIG. 12 is an illustration of an example system that facilitates receiving associations of local radio bearers to EPS bearers.

With reference to FIG. 12, illustrated is a system 1200 that receives associations between a local radio bearer and an EPS bearer. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving an association of an EPS bearer to a local radio bearer 1204. As described, the association can be received from an upstream eNB that associates the local radio bearer to the EPS bearer, determined based on a received QCI of the EPS bearer, and/or the like. Additionally, logical grouping 1202 can include an electrical component for storing the association in a routing table 1206.

In one example, the association can be stored for subsequent uplink packet routing. In addition, logical grouping 1202 can include an electrical component for receiving data related to the EPS bearer from an upstream eNB over the local radio bearer 1208. Moreover, logical grouping 1202 can include an electrical component for selecting a radio bearer of a downstream eNB for association to the EPS bearer 1210. Additionally, system 1200 can include a memory 1212 that retains instructions for executing functions associated with electrical components 1204, 1206, 1208, and 1210. While shown as being external to memory 1212, it is to be understood that one or more of electrical components 1204, 1206, 1208, and 1210 can exist within memory 1212.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   receiving, at a cell relay, an association of an evolved packet system (EPS) bearer to a local radio bearer and a portion of an identifier related to the EPS bearer from an upstream evolved Node B (eNB);
   storing, at the cell relay, the association and the portion of the identifier with an index of the local radio bearer in a routing table; and
   receiving, at the cell relay, data related to the EPS bearer from the upstream eNB over the local radio bearer.

2. The method of claim 1, wherein the receiving the association from the upstream eNB includes receiving the association in an RRCConnectionReconfiguration message.

3. The method of claim 1, further comprising receiving a quality of service (QoS) class identifier (QCI) related to the EPS bearer, wherein the receiving the association includes determining the association based at least in part on the QCI of the EPS bearer.

4. The method of claim 1, further comprising selecting a radio bearer of a downstream eNB for association to the EPS bearer.

5. A method comprising:
   receiving, at a cell relay, an association of an evolved packet system (EPS) bearer to a local radio bearer;
   associating the EPS bearer to a radio bearer of a directly connected user equipment (UE), wherein the receiving the association between the EPS bearer and the local radio bearer is based at least in part on a request received from the directly connected UE;
   storing, at the cell relay, the association in a routing table; and
   receiving, at the cell relay, data related to the EPS bearer from the upstream evolved Node B (eNB) over the local radio bearer.

6. A wireless communications apparatus, comprising:
   at least one processor configured to:
      obtain, at a cell relay, an association of an evolved packet system (EPS) bearer to a local radio bearer and a portion of an identifier related to the EPS bearer from an upstream evolved e Node B (eNB);
      store, at the cell relay, the association and the identifier with an index of the local radio bearer in a routing table for subsequent packet routing; and
      receive, at the cell relay, data from the upstream eNB related to the EPS bearer over the local radio bearer; and
   a memory coupled to the at least one processor.

7. The wireless communications apparatus of claim 6, wherein the at least one processor receives the association in an RRCConnectionReconfiguration message from the upstream eNB.

8. A wireless communications apparatus, comprising:
at least one processor configured to:
obtain, at a cell relay, an association of an evolved packet system (EPS) bearer to a local radio bearer;
receive a quality of service (QoS) class identifier (QCI) of the EPS bearer, wherein the association is obtained based at least in part on determining the local radio bearer relating to the QCI in a static mapping of QCIs to local radio bearers;
store, at the cell relay, the association in a routing table for subsequent packet routing; and
receive, at the cell relay, data from an upstream evolved Node B (eNB) related to the EPS bearer over the local radio bearer; and
a memory coupled to the at least one processor.

9. The wireless communications apparatus of claim 6, wherein the at least one processor is further configured to select a radio bearer of a downstream eNB for association to the EPS bearer.

10. A wireless communications apparatus, comprising:
at least one processor configured to:
obtain, at a cell relay, an association of an evolved packet system (EPS) bearer to a local radio bearer;
associate the EPS bearer to a radio bearer of a directly connected user equipment (UE), wherein the association is obtained based at least in part on a request from the directly connected UE;
store, at the cell relay, the association in a routing table for subsequent packet routing; and
receive, at the cell relay, data from an upstream evolved Node B (eNB) related to the EPS bearer over the local radio bearer; and
a memory coupled to the at least one processor.

11. An apparatus, comprising:
means for receiving, at a cell relay, an association of an evolved packet system (EPS) bearer to a local radio bearer and a portion of an identifier related to the EPS bearer from an upstream evolved Node B (eNB);
means for storing, at the cell relay, the association in a routing table, wherein the storing includes storing the portion of the identifier with an index of the local radio bearer; and
means for receiving, at the cell relay, data related to the EPS bearer from the upstream eNB over the local radio bearer.

12. The apparatus of claim 11, wherein the means for receiving the association receives the association in an RRCConnectionReconfiguration message.

13. The apparatus of claim 11, wherein the means for receiving the association determines the association based on a received (QoS) class identifier (QCI) related to the EPS bearer.

14. The apparatus of claim 11, further comprising means for selecting a radio bearer of a downstream eNB for association to the EPS bearer.

15. The apparatus of claim 11, wherein the means for receiving the association receives the association based at least in part on a request from a user equipment (UE) directly communicating with the apparatus.

16. A computer program product, comprising:
a non-transitory computer-readable medium comprising:
code for causing at least one computer to receive, at a cell relay, an association of an evolved packet system (EPS) bearer to a local radio bearer and a portion of an identifier related to the EPS bearer from an upstream evolved Node B (eNB);
code for causing the at least one computer to store, at the cell relay, the association in a routing table, wherein the storing includes storing the portion of the identifier with an index of the local radio bearer; and
code for causing the at least one computer to receive, at the cell relay, data related to the EPS bearer from the upstream eNB over the local radio bearer.

17. The computer program product of claim 16, wherein the code for causing the at least one computer to receive the association from the upstream eNB receives the association in an RRCConnectionReconfiguration message.

18. The computer program product of claim 16, wherein the computer-readable medium further comprises code for causing the at least one computer to receive a quality of service (QoS) class identifier (QCI) related to the EPS bearer, and the code for causing the at least one computer to receive the association determines the association based at least in part on the QCI of the EPS bearer.

19. The computer program product of claim 16, wherein the computer-readable medium further comprises code for causing the at least one computer to select a radio bearer of a downstream eNB for association to the EPS bearer.

20. A computer program product, comprising:
a non-transitory computer-readable medium comprising:
code for causing at least one computer to receive, at a cell relay, an association of an evolved packet system (EPS) bearer to a local radio bearer;
code for causing the at least one computer to associate the EPS bearer to a radio bearer of a directly connected user equipment (UE), wherein the association between the EPS bearer and the local radio bearer is received based at least in part on a request received from the directly connected UE;
code for causing the at least one computer to store, at the cell relay, the association in a routing table; and
code for causing the at least one computer to receive, at the cell relay data related to the EPS bearer from an upstream evolved Node B (eNB) over the local radio bearer.

21. A hardware apparatus, comprising:
a bearer select receiving component, at a cell relay, that receives an association of an evolved packet system (EPS) bearer to a local radio bearer and an identifier related to the EPS bearer from an upstream evolved Node B (eNB);
an EPS bearer mapping component, at the cell relay, that stores the association and the identifier related to the EPS bearer in a routing table; and
a bearer communicating component, at the cell relay, that receives data related to the EPS bearer from the upstream eNB over the local radio bearer.

22. The apparatus of claim 21, wherein the bearer select receiving component receives the association in an RRCConnectionReconfiguration message.

23. The apparatus of claim 21, wherein the bearer select receiving component is an EPS class determining component that discerns the association based on a received (QoS) class identifier (QCI) related to the EPS bearer.

24. The apparatus of claim 21, further comprising a relay bearer selecting component that selects a radio bearer of a downstream eNB for association to the EPS bearer.

25. The apparatus of claim 21, wherein the bearer communicating component receives the association based at least in part on a request from a user equipment (UE) directly communicating with the apparatus.

26. An apparatus comprising:
   means for receiving, at a cell relay, an association of an evolved packet system (EPS) bearer to a local radio bearer;
   means for associating the EPS bearer to a radio bearer of a directly connected user equipment (UE), wherein the receiving the association between the EPS bearer and the local radio bearer is based at least in part on a request received from the directly connected UE;
   means for storing, at the cell relay, the association in a routing table; and
   means for receiving, at the cell relay, data related to the EPS bearer from the upstream evolved Node B (eNB) over the local radio bearer.

27. A wireless communications method, comprising:
   obtaining, at a cell relay, an association of an evolved packet system (EPS) bearer to a local radio bearer;
   receiving a quality of service (QoS) class identifier (QCI) of the EPS bearer, wherein the association is obtained based at least in part on determining the local radio bearer relating to the QCI in a static mapping of QCIs to local radio bearers;
   storing, at the cell relay, the association in a routing table for subsequent packet routing; and
   receiving, at the cell relay, data from an upstream evolved Node B (eNB) related to the EPS bearer over the local radio bearer.

28. A wireless communications apparatus, comprising:
   means for obtaining, at a cell relay, an association of an evolved packet system (EPS) bearer to a local radio bearer;
   means for receiving a quality of service (QoS) class identifier (QCI) of the EPS bearer, wherein the association is obtained based at least in part on determining the local radio bearer relating to the QCI in a static mapping of QCIs to local radio bearers;
   means for storing, at the cell relay, the association in a routing table for subsequent packet routing; and
   means for receiving, at the cell relay, data from an upstream evolved Node B (eNB) related to the EPS bearer over the local radio bearer.

29. A computer program product, comprising:
   a non-transitory computer-readable medium comprising:
      code for obtaining, at a cell relay, an association of an evolved packet system (EPS) bearer to a local radio bearer;
      code for receiving a quality of service (QoS) class identifier (QCI) of the EPS bearer, wherein the association is obtained based at least in part on determining the local radio bearer relating to the QCI in a static mapping of QCIs to local radio bearers;
      code for storing, at the cell relay, the association in a routing table for subsequent packet routing; and
      code for receiving, at the cell relay, data from an upstream evolved Node B (eNB) related to the EPS bearer over the local radio bearer.

* * * * *